(12) United States Patent
Rosenblatt et al.

(10) Patent No.: US 8,478,253 B2
(45) Date of Patent: Jul. 2, 2013

(54) DYNAMIC IDENTITY ASSOCIATION WITHIN A WIRELESS NETWORK

(75) Inventors: Ariel Rosenblatt, Pincourt (CA); Louis Barbeau, St-Bruno (CA); Alex Rootham, North York (CA); Pablo Reitkop, Lasalle (CA); Daniel Cote, Lasalle (CA)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/567,753

(22) Filed: Aug. 6, 2012

(65) Prior Publication Data

US 2012/0302232 A1 Nov. 29, 2012

Related U.S. Application Data

(62) Division of application No. 11/815,397, filed as application No. PCT/CA2006/000128 on Feb. 3, 2006, now Pat. No. 8,238,884.

(60) Provisional application No. 60/649,157, filed on Feb. 3, 2005.

(51) Int. Cl.
*H04M 3/42* (2006.01)
(52) U.S. Cl.
USPC ...................................................... 455/414.1
(58) Field of Classification Search
USPC ........................................................ 455/414.1
See application file for complete search history.

(56) References Cited

U.S. PATENT DOCUMENTS

| | | | |
|---|---|---|---|
| 5,924,035 A | 7/1999 | Joensuu | |
| 6,539,223 B1 * | 3/2003 | Bijanki et al. | ............. 455/456.3 |
| 6,658,253 B1 | 12/2003 | Berggren et al. | |
| 6,757,538 B1 | 6/2004 | Howe | |
| 6,907,242 B2 | 6/2005 | Thakker | |
| 6,978,134 B1 * | 12/2005 | Palviainen | ..................... 455/433 |
| 7,039,403 B2 | 5/2006 | Wong | |
| 7,139,558 B1 * | 11/2006 | Palviainen | ..................... 455/417 |

(Continued)

FOREIGN PATENT DOCUMENTS

| | | |
|---|---|---|
| EP | 1 089 585 A2 | 4/2001 |
| WO | WO 93/25050 | 12/1993 |
| WO | WO 98/11754 | 3/1998 |
| WO | WO 2004/075598 A1 | 9/2004 |

OTHER PUBLICATIONS

Notice of Allowability for U.S. Appl. No. 11/815,397 (May 23, 2012).

(Continued)

*Primary Examiner* — Nathan Mitchell
(74) *Attorney, Agent, or Firm* — Jenkins, Wilson, Taylor & Hunt, P.A.

(57) ABSTRACT

A method of providing access to telecommunication services involves receiving a routing information request for terminating a communication with a mobile station located within a visited geographic region, the routing information request including a directory number local to the visited geographic region. A subscriber identity associated with the received directory number is then dynamically selecting from an evaluation of a decision tree, the decision tree associating a reference directory number with a plurality of reference subscriber identities. Each reference subscriber identity is associated with a telecommunications service user, each user being registered to receive telecommunication services within a respective home geographic region, the home geographic region being different from the visited geographic region. The mobile station receives access to the telecommunication services within the visited geographic region via the selected subscriber identity.

6 Claims, 25 Drawing Sheets

U.S. PATENT DOCUMENTS

| | | | |
|---|---|---|---|
| 7,577,431 B2* | 8/2009 | Jiang | 455/432.1 |
| 8,238,884 B2 | 8/2012 | Rosenblatt et al. | |
| 2002/0177440 A1 | 11/2002 | Mukherjee | |
| 2003/0064723 A1* | 4/2003 | Thakker | 455/432 |
| 2003/0227899 A1* | 12/2003 | McCann | 370/349 |
| 2006/0079236 A1* | 4/2006 | Del Pino et al. | 455/445 |
| 2007/0072587 A1* | 3/2007 | Della-Torre | 455/410 |
| 2007/0232300 A1* | 10/2007 | Wolfman | 455/433 |
| 2008/0020760 A1* | 1/2008 | Elkarat et al. | 455/433 |
| 2009/0029684 A1 | 1/2009 | Rosenblatt et al. | |

OTHER PUBLICATIONS

Notice of Allowance and Fee(s) Due for U.S. Appl. No. 11/815,397 (Apr. 4, 2012).

Final Official Action for U.S. Appl. No. 11/815,397 (Nov. 22, 2011).

Non-Final Official Action for U.S. Appl. No. 11/815,397 (Jun. 13, 2011).

Restriction and/or Election Requirement for U.S. Appl. No. 11/815,397 (Jan. 27, 2011).

Noting of loss of rights pursuant to Rule 112(1) EPC for European Application No. 06705093.0 (May 25, 2010).

Communication pursuant to Article 94(3) EPC for European Application No. 06705093.0 (Oct. 9, 2009).

Extended European Search Report for European Application No. 06705093.0 (Jul. 1, 2009).

International Preliminary Report on Patentability for International Application No. PCT/CA2006/000128 (Jun. 4, 2007).

Written Opinion of the International Searching Authority for International Application No. PCT/CA2006/000128 (May 1, 2006).

International Search Report for International Application No. PCT/CA2006/000128 (May 1, 2006).

Office Action for Canadian Application No. 2,596,732 (Jan. 21, 2013).

* cited by examiner

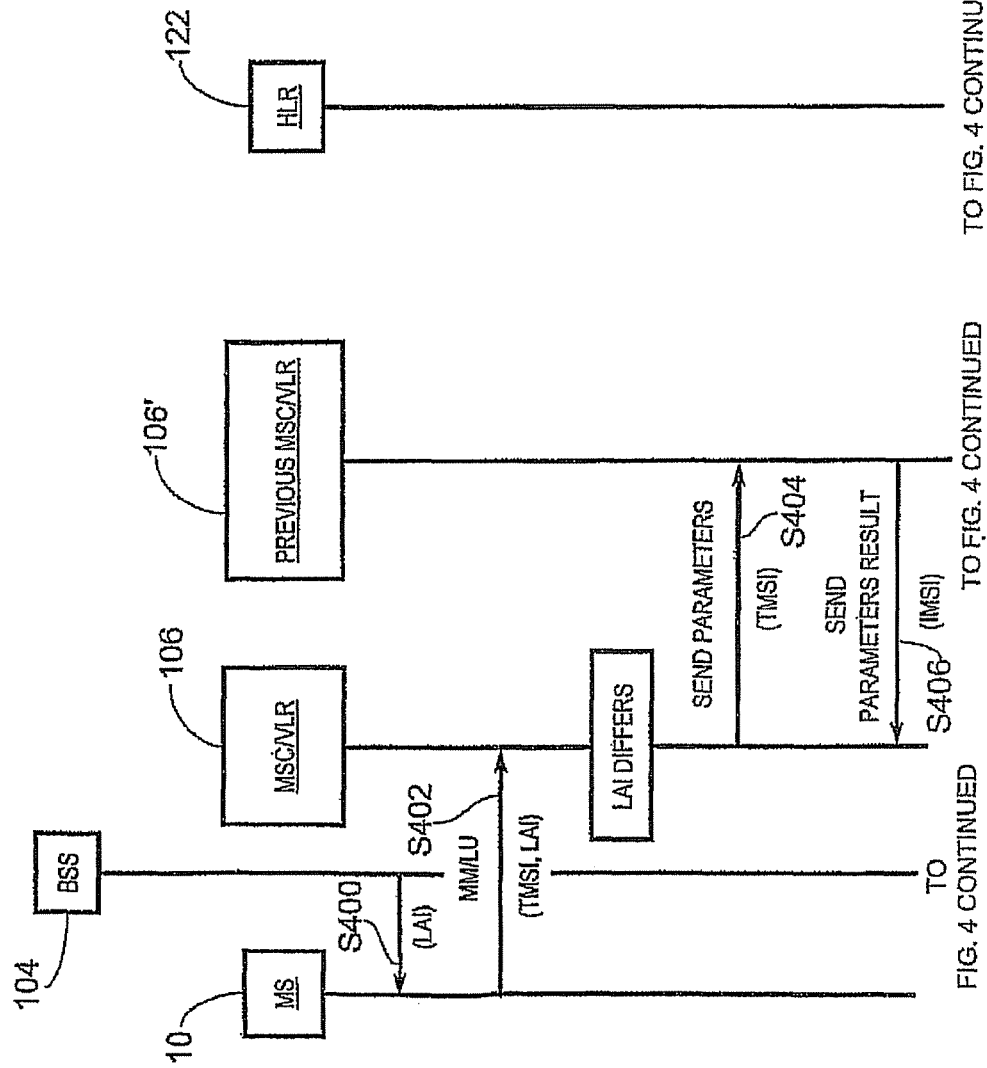

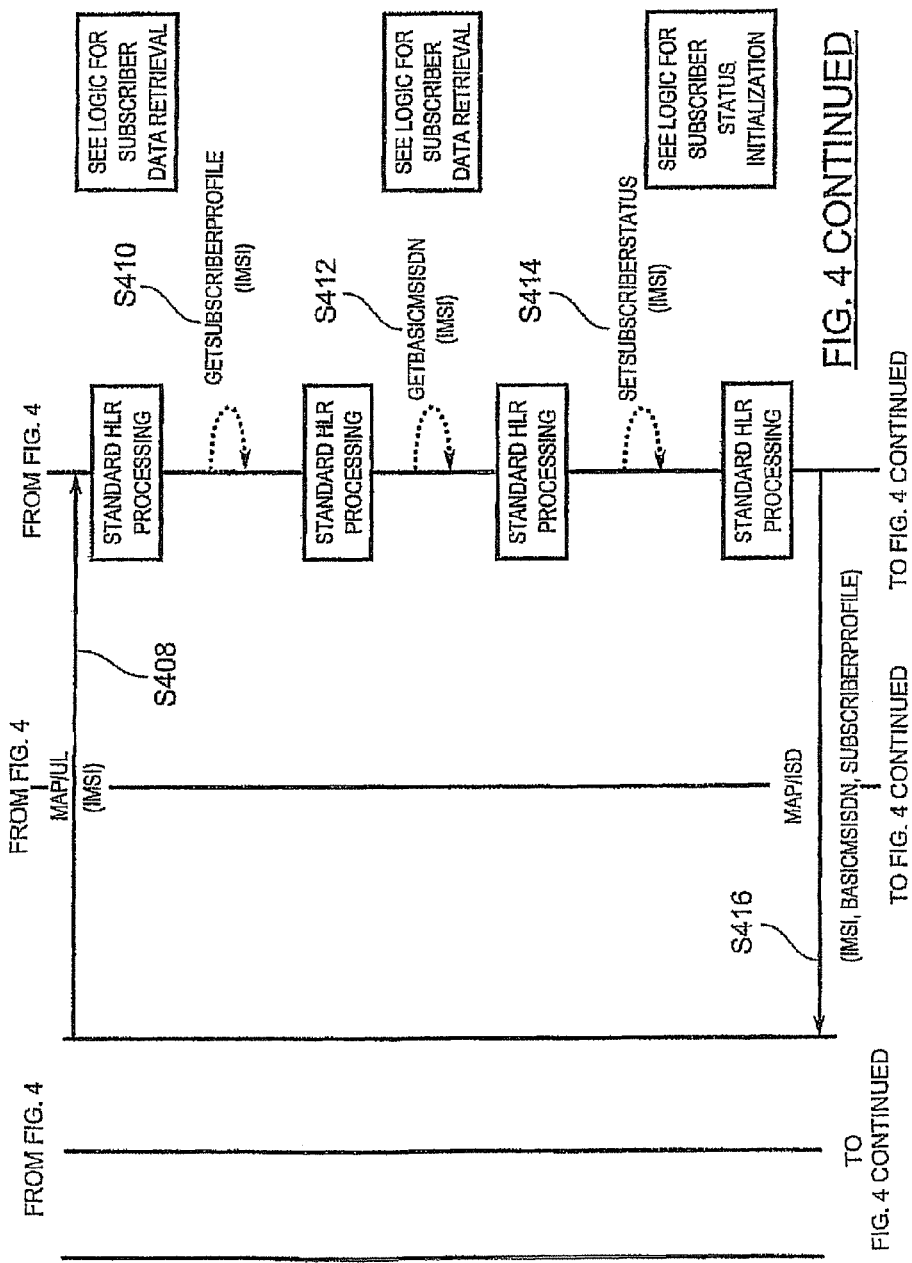

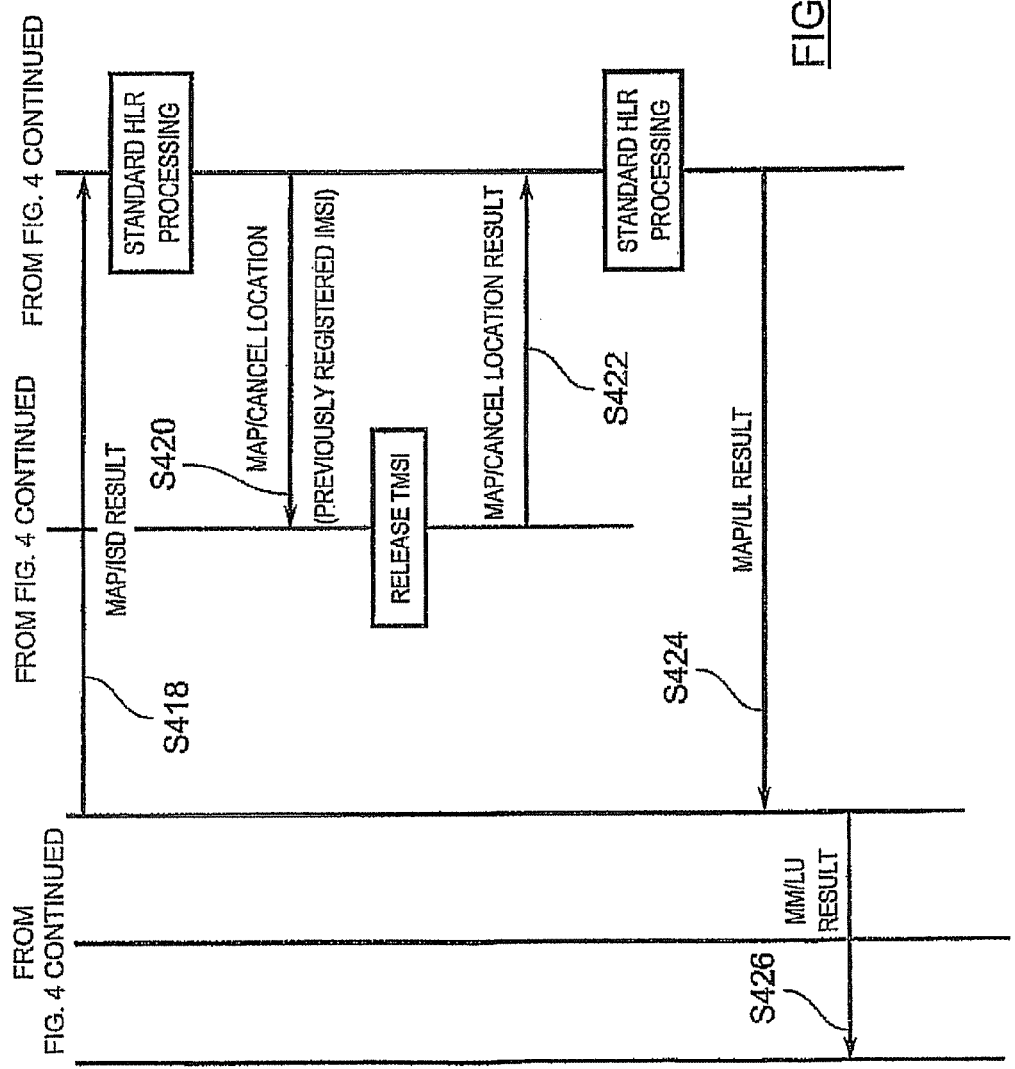

DYNAMIC IDENTITY ASSOCIATION WITHIN A WIRELESS NETWORK

PRIORITY CLAIM

This application is a divisional of U.S. patent application Ser. No. 11/815,397, filed Aug. 2, 2007, now U.S. Pat. No. 8,238,884 which is a national stage application under 35 U.S.C. §371 of PCT Application No. PCT/CA2006/000128, filed Feb. 3, 2006, which claims the benefit of U.S. Provisional Patent Application Ser. No. 60/649,157, filed Feb. 3, 2005; the disclosures of which are incorporated herein by reference in their entireties.

FIELD OF THE INVENTION

This invention relates to a wireless telecommunication system. In particular, this invention relates to a method and system for providing wireless services subscribers with access to telecommunication services within different geographical areas of a wireless telecommunication system.

BACKGROUND OF THE INVENTION

In a conventional GSM (Global System for Mobile Communication) network, a wireless services subscriber has a wireless MS (Mobile Station) which is assigned an IMSI (International Mobile Subscriber Identity). The IMSI is uniquely associated with the subscriber, and is stored in a Subscriber Identity Module that is installed in the wireless telephone.

The subscriber's PLMN (Public Land Mobile Network) maintains a subscription with the local subscriber for the provision of local telecommunications services. As part of that subscription, the home PLMN maintains a static association between the local subscriber's and a local MSISDN (Mobile Subscriber ISDN Number) directory number that is uniquely associated with the subscriber.

The PLMN includes a Home Location Register HLR (Home Location Register), and one or more MSC/VLRs (Mobile Switching Centre/Visitor Location Register). Any one of the MSC/VLRs will be in communication with the subscriber's MS as the subscriber roams within the PLMN. The MSC/VLR currently in communication with the MS maintains the subscriber's IMSI and MSISDN directory number, and a IMSI (Temporary Mobile Subscriber Identity). The IMSI is a temporary identifier that is local to the servicing MSC/VLR and used by the MSC/VLR. to temporarily identify the MS.

The HLR maintains Subscriber Data associated with the subscriber, including the subscriber's IMSI, associated MSISDN directory number, and the MSC/VLR that is currently servicing the MS.

An originating party originates a telephone call with the subscriber by dialing the subscriber's MSISDN directory number from the party's PSTN (Public Switched Telephone Network). The PSTN forwards the MSISDN directory number to a GMSC (Gateway Mobile Switching Centre) that is associated with the subscriber's PLMN. The GMSC, in turn, forwards the MSISDN directory number to the subscriber's HLR, and requests that the HLR provide routing information which the GMSC can use to terminate the telephone call.

Using the MSISDN directory number, the HLR. identifies the servicing MSC/VLR, and requests that the MSC/VLR provide the requested routing information. The MSC/VLR replies with a temporary MSRN (Mobile Station Roaming Number), and maintains an association between the MSRN and the subscriber's IMSI.

The GMSC uses the MSRN to route the telephone call to the servicing MSC/VLR. The servicing MSC/VLR terminates the telephone call at the MS using the IMSI associated with the MSRN, and then makes the MSRN available for use in subsequent terminating calls.

A problem with the conventional GSM network is that the MSISDN number is local to the subscriber's home PLMN. Therefore, if a subscriber roams outside the subscriber's home PLMN, in order to provide the subscriber with telecommunications services within the visited PLMN the visited PLMN must first contact the subscriber's home PLMN to obtain the subscriber's Subscriber Data. If the Subscriber Data reveals that the subscriber is entitled to telecommunications services within the visited PLMN, the subscriber can then originate a call within the visited PLMN. Thereafter, if a call is issued to the subscriber's home MSISDN number while the subscriber's mobile terminal is in the visited PLMN, to terminate the call the home PLMN must forward the call to the visited PLMN which, in turn, terminates the call to the mobile terminal, as described above.

To offset the costs of this additional overhead, typically a subscriber must pay roaming charges if the subscriber roams outside the subscriber's home PLMN and receives a terminating call to its home MSISDN number. These charges are payable even if the party that originated the call and the subscriber are both resident within the same visited PLMN.

Similarly, if the subscriber originates a telephone call outside the subscriber's home PLMN, the subscriber must pay roaming charges even if the subscriber and the party that received the call are both resident within the same visited PLMN. As a result, attempts have been made to reduce the applicability of roaming charges as a wireless subscriber roams between PLMNs, One solution has been to negotiate roaming agreements between PLMNs. These agreements typically limit the roaming charges that would be payable as wireless subscriber roams between PLMNs.

Bijanki (U.S. Pat. No. 6,539,223) teaches a mobile telecommunications system that includes a HLR having entries associating the identity (e.g. IMSI) of a mobile telecommunications device with a plurality of MSISDN directory numbers. In the process of terminating a telephone call from a MSC, the HLR uses supplemental information, such as the geographical location of the mobile telecommunications device, to determine which of the directory numbers to use for the purpose of telephone call termination, The supplemental information may be provided to the HLR either from the MSC, or a GPS unit associated with the mobile telecommunications device.

Typically, the HLR includes a home MSISDN directory number (MN) associated with the mobile's home sector, and a mobile MSISDN directory number (MDN) associated with a sector other than the mobile's home sector. If the mobile telecommunications device is located within its home sector, and a call to the HDN originates from a PSTN, the MSC terminates the call to the mobile via the HDN. However, if the mobile telecommunications device is not located within its home sector, the MSC does not terminate the call to the mobile. Instead, if the user of the mobile has activated a call-forwarding feature to the mobile's MDN, the MSC forwards the call to mobile via the MDN.

Thakker (U.S. Pat. No. 6,907,242) teaches a method and system for providing local telecommunications services to visited subscribers of a GSM network. According to the method, a home PLMN transmits a non-local subscriber's IMSI to a local PLMN, requesting that the local PLMN provide telecommunications services for the non-local subscriber. In response, the local PLMN creates a local subscription for the non-local subscriber, which includes, at a minimum, a local MSISDN directory number that is uniquely associated with the subscriber. Thereafter, the local PLMN maintains a mapping between the non-local subscriber's IMSI and the unique local MSISDN directory number.

When the non-local subscriber's visits the local PLMN, the local MSC/VLR initiates a location update with the subscriber's Home Location Register HLR (Home Location Register) and receives, in response, the non-local subscriber's Subscriber Data. The local MSC/VLR updates the local HLR with the subscriber's new location, using the unique local MSISDN directory number associated with the non-local subscriber's IMSI The local HLR then responds to the local MSC/VLR. with an ISD (Insert Subscriber Data) message.

Thereafter, local calls to the non-local subscriber's unique local MSISDN directory number are directed to the non-local subscriber via the local HLR. After a predetermined period of time, or the usage of a predetermined number of air-time minutes, the local HLR purges the mapping between the unique local MSISDN directory number and the non-local subscriber's IMSI, and returns the unique local MSISDN directory number to a pool in the local PLMN for subsequent remapping.

SUMMARY OF THE INVENTION

The invention described herein provides wireless subscribers with access to telecommunication services by dynamically selecting one of a number of local directory numbers for association with a subscriber identity of a telecommunications service user, and by dynamically selecting one of a number of subscriber identities of a telecommunications service user for association with a local directory number.

According to one aspect of the invention, there is provided a method of providing access to telecommunication services that involves:
  receiving a location update request after a mobile station enters a visited geographic region, the location update request including a subscriber identity associated with a telecommunications service user, the user being registered to receive telecommunication services within a home geographic region, the home geographic region being different from the visited geographic region; and
  dynamically selecting a directory number associated with the received subscriber identity from an evaluation of a decision tree, the directory number being local to the visited geographic region, the decision tree associating a reference subscriber identity with a plurality of reference directory numbers, the mobile station receiving access to the telecommunications services within the visited geographic region via the selected directory number.

According to another aspect of the invention, there is provided a computer-readable medium carrying computer processing instructions which, when executed by a computer, cause the computer to perform the following steps:
  receive a location update request after a mobile station enters a visited geographic region, the location update request including a subscriber identity associated with a telecommunications service user, the user being registered to receive telecommunication services within a home geographic region, the home geographic region being different from the visited geographic region; and
  dynamically select a directory number associated with the received subscriber identity from an evaluation of a decision tree, the directory number being local to the visited geographic region, the decision tree associating a reference subscriber identity with a plurality of reference directory numbers.

According to another aspect of the invention, there is provided a method of providing access to telecommunication services that involves:
  receiving a location update request in response to a mobile station entering a visited geographic region associated with. a mobile switching centre, the location update request including a subscriber identity associated with a telecommunications service user, the user being registered to receive telecommunication services within a home geographic region, the home geographic region being different from the visited geographic region;
  dynamically selecting a directory number associated with the received subscriber identity from an evaluation of a decision tree, the directory number being local to the visited geographic region, the decision tree associating a reference subscriber identity with a plurality of reference directory numbers; and
  providing the mobile station with access to the telecommunication services within the visited geographic region by transmitting the selected directory number to the mobile switching centre.

According to another aspect of the invention, there is provided a computer-readable medium carrying computer processing instructions which, when executed by a computer, cause the computer to perform the following steps:
  receive a location update request in response to a mobile station entering a visited geographic region associated with a mobile switching centre, the location update request including a subscriber identity associated with a telecommunications service user, the user being registered to receive telecommunication services within a home geographic region, the home geographic region being different from the visited geographic region;
  dynamically select a directory number associated with the received subscriber identity from an evaluation of a decision tree, the directory number being local to the visited geographic region, the decision tree associating a reference subscriber identity with a plurality of reference directory numbers; and
  transmit the selected directory number to the mobile switching centre.

In one implementation of the invention, the decision tree includes at least one logic rule, each associating the reference subscriber identity with one of the reference directory numbers, and the directory number is selected by evaluating the logic rules that correlate with the received subscriber identity. Preferably, the logic rules are evaluated based on at least one of the following parameters: the visited geographic region, the time instant of the location update request, the next available directory number in a list of the directory numbers, and membership of the user in a group.

According to another aspect of the invention, there is provided a method of providing access to telecommunication services that involves:
  receiving a routing information request for terminating a communication with a mobile station located within a visited geographic region, the routing information request including a directory number local to the visited geographic region; and
  dynamically selecting a subscriber identity associated with the received directory number from an evaluation of a decision tree, the decision tree associating a reference directory number with a plurality of reference subscriber identities, each reference subscriber identity being associated with a telecommunications service user, each user being registered to receive telecommunication services within a respective home geographic region, the home geographic region being different from the visited geographic region, the mobile station receiving access to the telecommunication services within the visited geographic region via the selected subscriber identity.

According to another aspect of the invention, there is provided a computer-readable medium carrying computer processing instructions which, when executed by a computer, cause the computer to perform the following steps:

receive a routing information request for terminating a communication with a mobile station located within a visited geographic region, the routing information request including a directory number local to the visited geographic region; and dynamically select a subscriber identity associated with the received directory number from an evaluation of a decision tree, the decision tree associating a reference directory number with a plurality of reference subscriber identities, each reference subscriber identity being associated with a telecommunications service user, each user being registered to receive telecommunication services within a respective home geographic region, the home geographic region being different from the visited geographic region.

According to another aspect of the invention, there is provided a method of providing access to telecommunication services that involves:

receiving from a routing information request for terminating a communication with a mobile station located within a visited geographic region associated with a mobile switching centre, the routing information request including a directory number local to the visited geographic region;

dynamically selecting a subscriber identity associated with the received directory number, from an evaluation of a decision tree, the decision tree associating a reference directory number with a plurality of reference subscriber identifies, each reference subscriber identity being associated with a telecommunications service user, each user being registered to receive telecommunication services within a respective home geographic region, the home geographic region being different from the visited geographic region; and providing the mobile station with access to the telecommunication services within the visited geographic region by transmitting the selected subscriber identity to the mobile switching centre.

According to another aspect of the invention, there is provided a computer-readable medium carrying computer processing instructions which, when executed by a computer, cause the computer to perform the following steps:

receive from a routing information request for terminating a communication with a mobile station located within a visited geographic region associated with a mobile switching centre, the routing information request including a directory number local to the visited geographic region;

dynamically select a subscriber identity associated with the received directory number, from an evaluation of a decision tree, the decision tree associating a reference directory number with a plurality of reference subscriber identities, each reference subscriber identity being associated with a telecommunications service user, each user being registered to receive telecommunication services within a respective home geographic region, the home geographic region being different from the visited geographic region; and transmit the associated subscriber identity to the mobile switching centre.

In one implementation of the invention, the decision tree includes at least one logic rule, each associating the reference directory number with one of the reference subscriber identities, and the subscriber identity is selected by evaluating the logic rules that correlate with the received directory number. Preferably, the logic rules are evaluated based on at least one of the following parameters: the time instant of the routing information request, the visited geographic region, the next available subscriber identity in a list of the subscriber identities, and membership of the user in a group.

BRIEF DESCRIPTION OF THE DRAWINGS

The invention will now be described, by way of example only, with reference to the accompanying drawings, in which:

FIG. 4 is a signal flow diagram depicting the operation of the mobile telecommunications system after a mobile telecommunications device roams into a visited geographical region;

DETAILED DESCRIPTION OF THE PREFERRED EMBODIMENT

Mobile Telecommunications System 100

Figure 1:
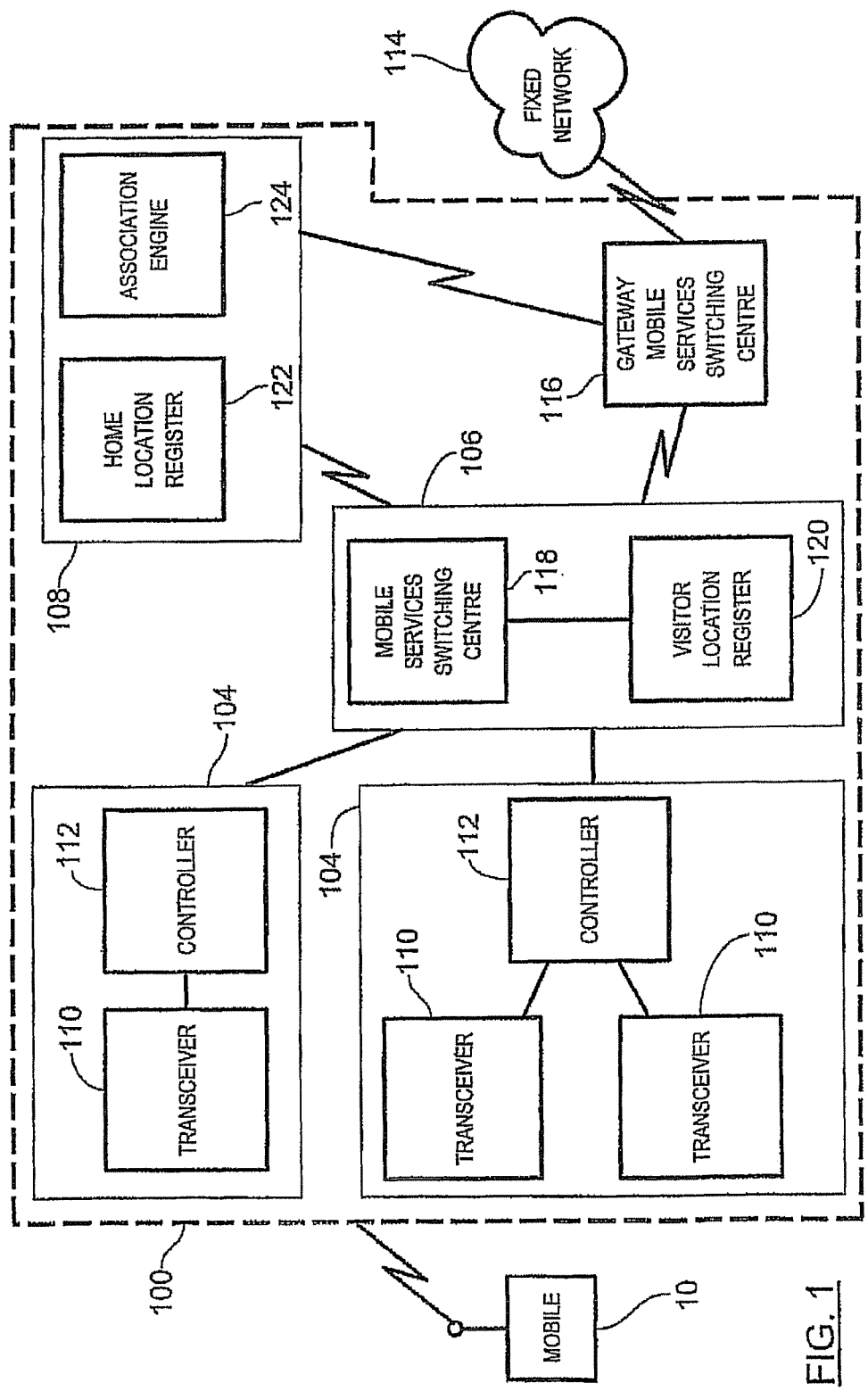
FIG. 1 is a schematic view of the mobile telecommunications system, according to the invention, depicting the base station subsystems, the network subsystems, and the Home Location Register and the Association Engine of the network management system.

Turning to FIG. 1, a mobile telecommunications device 10 is shown in communication with a mobile telecommunications system 100. The mobile telecommunications system 100 comprises a plurality of base station subsystems (BSS) 104, a plurality of network subsystems 106, and a network management system 108. Preferably, the mobile telecommunications system 100 is configured as a GSM (Global System for Mobile Communication) network. However, the mobile telecommunications system 100 may instead have other network configurations.

Although the mobile telecommunications system 100 is shown comprising two base station subsystems 104 and a single network subsystem 106, typically the mobile telecommunications system 100 comprises several base station subsystems 104 and network subsystems 106.

The mobile telecommunications device 10 typically comprises a wireless telephone or wireless personal digital assistant, and is uniquely identified in the mobile telecommunications system 100 by an)MEI (International Mobile Equipment Identity). The mobile telecommunications device 10 includes a SmartCard, commonly referred to as a SIM (Subscriber Identity Module), upon which is stored an IMSI (International Mobile Subscriber Identity), The IMSI acts as an identifier which the mobile telecommunications system 100 uses to identify the owner of the mobile telecommunications device 10.

The base station subsystems (1355) 104 are each deployed in a respective geographical region, and communicate with the mobile telecommunications devices 10 located in their respective geographical region. Each base station subsystem 104 is in communication with the mobile telecommunications device 10 in its respective geographical region over a wireless link, and includes one or more base station transceivers 110, and a base station controller 112. Each base station transceiver 110 includes one or more radio transceivers that establish the wireless link between the mobile telecommunications device 10 and the base station subsystem 104. The base station controller 112 controls the base station transceivers 110, and manages the wireless link between the mobile telecommunications device 10 and the base station subsystem 104, Each network subsystem 106 is in communication with one or more of the base station subsystems 104. The network subsystems 106 are also in communication with a fixed network 114, such as PSTN (Public Switched Telephone Network) or ISDN (Integrated Service Digital Network) via a GMSC (Gateway Mobile Services Switching Centre) 116. The GMSC 116 acts as an interface or switching node between the mobile telecommunications system 100 and the fixed network 114.

Each network subsystem 106 comprises a MSC (Mobile Services Switching Centre) 118, and a VLR (Visitor Location Register) 120. Although the MSC 118 and the VLR 120 are shown as separate functional entities, typically the MSC 118 and the VLR 120 of each network subsystem 106 are implemented together as a single networked computer, so that the geographical region controlled by the MSC 118 corresponds to the geographical region controlled by the VLR 120.

Each MSC 118 is in communication with the base station controllers 114 of the associated base station subsystems 104, and acts as an interface or switching node between the network subsystem 106 and the GMSC 116. The MSC 118 also communicates with the VLR 120 and the network management system 108 via Mobile Application Part (MAP) on top of SS7 (Signaling System Number 7) protocol. As will be explained, the MSC 118, in cooperation with the VLR 120 and the network management system 108, provides the functionality required to provide telecommunications services far the mobile telecommunications device 10, such as registration, authentication, location updating, and call routing.

Each VLR 120 contains administrative information required to provide call control and provide subscribed services for each mobile telecommunications device 10 located within the geographical region controlled by the VLR 120. Typically, the VLR 120 maintains the IMSI, the IMSI (Temporary Mobile Subscriber Identity), the MSISDN (Mobile Subscriber Integrated Service Digital Network) directory number, and the MSRN (Mobile Station Roaming Number) for each mobile telecommunications device 10 within the controlled geographical region.

The network management system 108 is typically implemented as a networked computer server, which communicates with the network subsystem 106 and GMSC 116 via MAP on top of SS7 protocol. The network management system 108 typically comprises a non-volatile memory, a main memory, and a central processing unit in communication with the non-volatile memory and the main memory. The non-volatile memory carries computer processing instructions for the network management system 108 which, when loaded into the main memory and executed by the central processing unit, define a HLR (Home Location Register) 122, and an AE (Association Engine) 124.

Although the HLR 122 and the AE 124 are preferably implemented on single networked computer, the HLR 122 and the AE 124 may instead by implemented on separate networked computers. Further, although the HLR 122 and the AE 124 are preferably implemented in computer software, the HLR 122 and the AE 124 may instead be implemented in electronics hardware.

Home Location Register 122 and Association Engine 124

Figure 2:
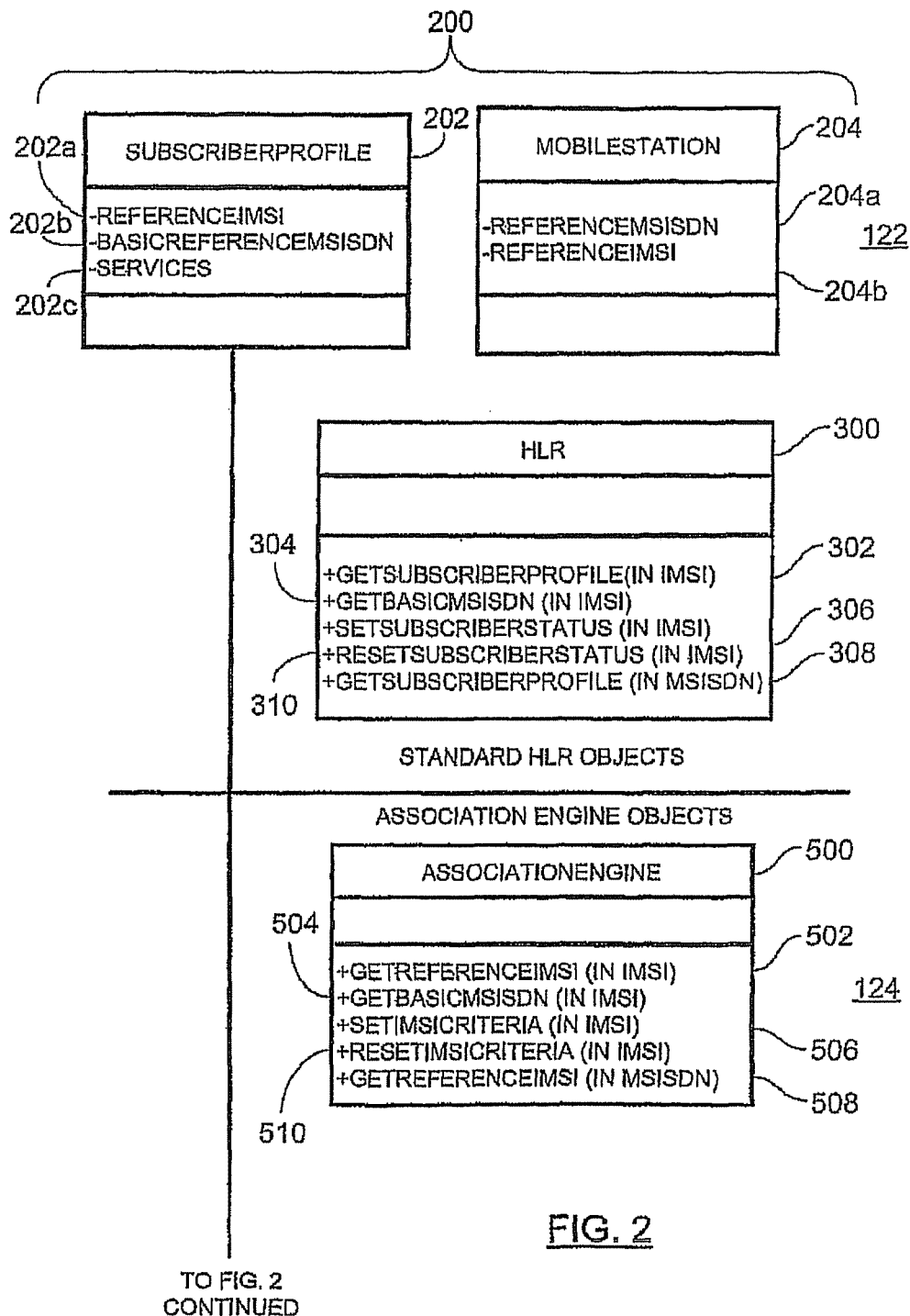
FIG. 2 is a representation of the structure of the Home Location Register and the Association Engine depicted in FIG. 1.
Figure 2:
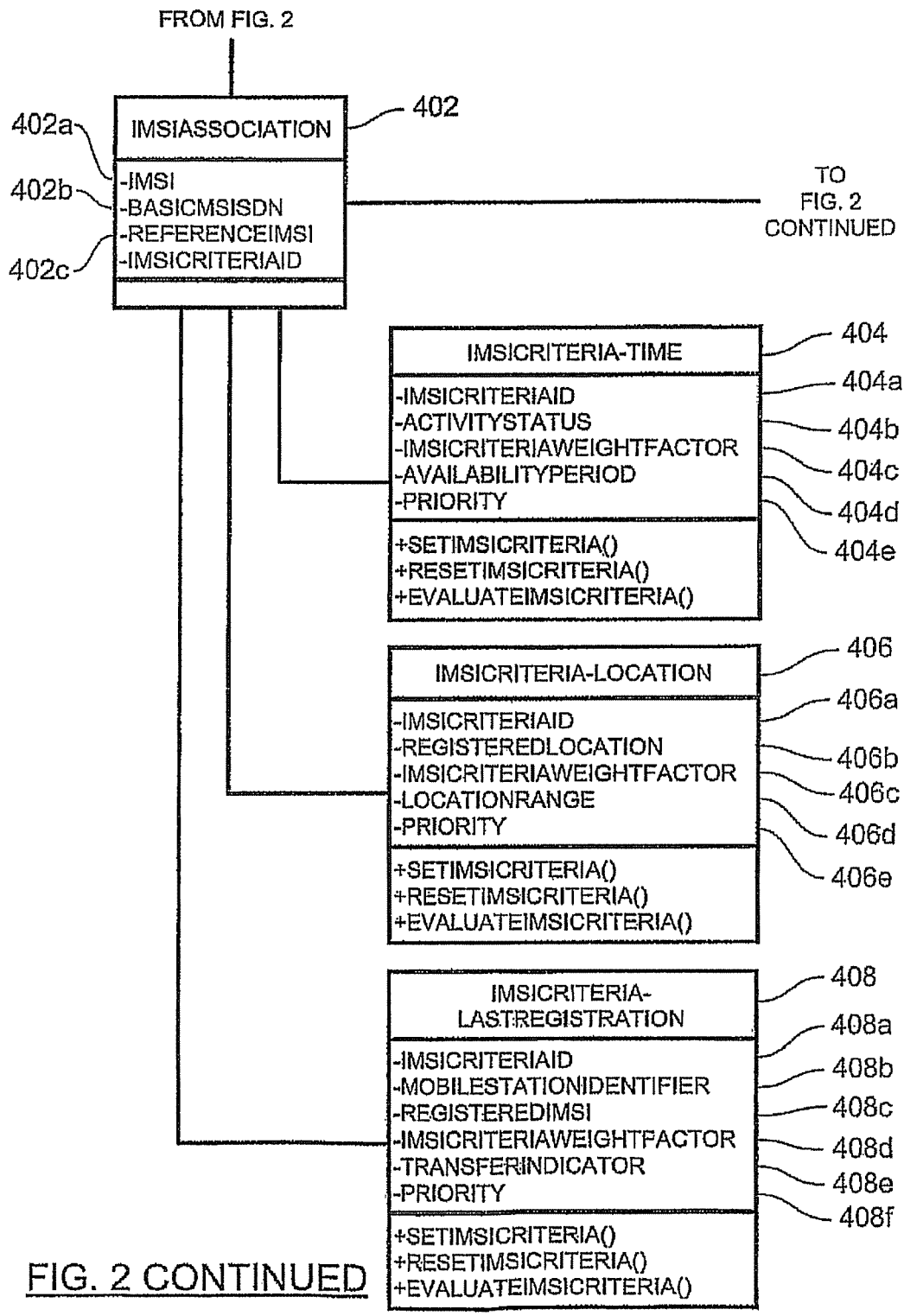
Figure 2:
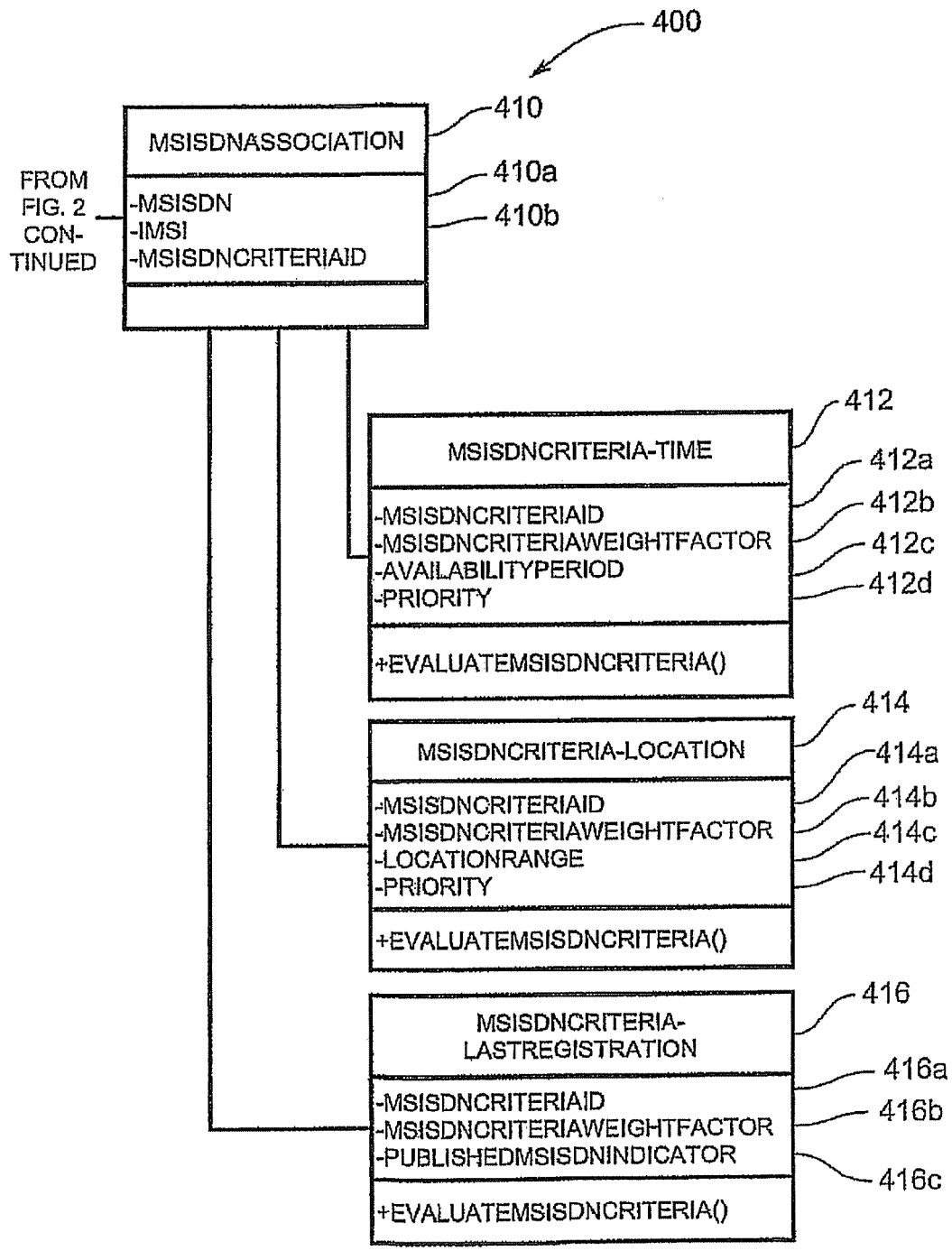

The preferred implementation of the HLR 122 and the AE 124 is depicted in FIG. 2. As shown, the HLR 122 includes a relational database 200 of linked database elements, and a set of associated methods 300. Similarly, the AE 124 includes a relational database 400 of linked database elements, and a set of associated methods 500. Further, selected database elements in the HLR database 200 are linked to corresponding database elements in the AE database 400. Further, selected HLR methods 300 are configured to call corresponding AE methods 500. However, it is not essential for the HLR 122 and the AE 124 to be implemented in this fashion.

The HLR database 200 maintains basic administrative information for each registered user of the GSM network. As shown, the HLR database 200 includes SubscriberProfile tables 202, and MobileStation tables 204. Each SubscriberProfile table 202 includes a ReferenceImsi record 202a identifying the IMSI associated with a registered user of the telecommunications network, a BasicReferenceMsIsdn record 202b identifying the default MSISDN associated with the and a Services record 202c identifying the services for which the user has subscribed (e.g. call display, call waiting, voice-mail, call forwarding).

Each MobileStation table 204 includes a ReferenceImsi record 204a for linking to one of the SubscriberProfile tables 202, and a ReferenceMsIsdn record 204b for associating a plurality of MSISDNs with one IMSI. One purpose served by the ReferenceMsIsdn record 204b is that it allows the subscriber to have a different MSISDN for each of a number of different telecommunications services (eg. Voice, Facsimile), all associated with the same IMSI. As will be described, the mobile telecommunications system 100 uses the MobileStation table 204 to locate the associated SubscriberProfile table 202 when attempting to terminate call to a mobile telecommunications device 10.

The HLR methods 300 include a GetSubscriberProfileImsi method 302, a GetBasicMsIsdn method 304, a SetSubscriberStatus method 306, a GetSubscriberProfileMsIsdn method 308, and a ResetSubscriberStatus method 310. The HLR methods 300 will be discussed in greater detail below.

The AE database 400 maintains supplemental administrative information for each registered user of the telecommunications network, such as a preferred set of reference MSISDNs associated with each registered user's IMSI, a preferred set of reference IMSIs associated with each of a plurality of MSISDNs, and evaluation parameters linking together this information. The AE methods 500 are used to evaluate these associations.

As will be explained, the AE database 400 and the AE methods 500 together define a decision tree that dynamically associates reference subscriber identities with reference directory numbers. The decision tree includes a first set of logic rules each associating a unique reference IMSI with one of a number of the reference MSISDNs, and a second set of logic rules each associating a unique reference MSISDN with one of a number of the reference IMSIs.

The first set of logic rules is used to assign a MSISDN to an IMSI when a user's mobile telecommunications device 10 enters the geographical region associated with a visited network subsystem 106. The second set of logic rules is used to assign an IMSI to a MSISDN when the mobile telecommunications system 100 attempts to terminate a telephone call with a mobile telecommunications device 10 that is located in the visited geographical region (the region serviced by the visited network subsystem 106).

Each logic rule is evaluated using one or more evaluation parameters. Preferred evaluation parameters include the current geographical region of the mobile telecommunications device 10, the time instant of a location update request, the next available MSISDN in a list of MSISDNs, and membership of the subscriber in a group.

As shown, the AE database 400 includes ImsiAssociation tables 402, ImsiCriteria-Time tables 404, InisiCriteria-Location tables 406, ImsiCriteria-LastRegistration tables 408, MsIsdnAssociation tables 410, MsIsdnCriteria-Time tables 412, MsIsdnCriteria-Location tables 414, and MsIsdnCriteria-LastRegistration tables 416.

Each ImsiAssociation table 402 includes an Imsi record 402a identifying the IMSI associated with a registered user of the GSM network, a BasicMsIsdn record 402b identifying a MSISDN associated with the IMSI, and a ReferenceImsi record 402c. The ReferenceImsi record 402e is used to group together all the IMSIs that have been assigned to a common subscriber.

Each ImsiAssociation table 402 may be associated with one of the ImsiCriteria-Time tables 404, one of the ImsiCriteria-Location tables 406, or one of the ImsiCriteria-LastRegistration tables 408.

Each ImsiCriteria-Time table 404 includes an ImsiCriteriaId record 404a for linking with one of the ImsiAssociation tables 402, ActivityStatus record 404b that is set if the user's mobile telecommunications device 10 is located within one of the geographic regions serviced by the mobile telecommunications system 100; an ImsiCriteriaWeightFactor record 404c for ranking the association defined by the corresponding ImsiAssociation table 402 relative to other such associations, an AvailabilityPeriod record 404d identifying the time period during which the association defined by the corresponding ImsiAssociation table 402 is valid, and a Priority record 404e for ranking the criteria defined in this table relative to other criteria. The Priority record 404e typically includes a hexadecimal value between x00 and xFF, inclusive.

Each Imsicriteria-Location table 406 includes an ImsiCriteriaId record 406a for linking with one of the ImsiAssociation tables 402, and a RegisteredLocation record 406b that identifies the geographical region in which the mobile telecommunications device 10 is currently located. Typically, the RegisteredLocation record 406b record contains the SS7 address of the network subsystem 106 currently servicing the user's mobile telecommunications device 10.

Each ImsiCriteria-Location table 406 also includes an ImsiCriteriaWeightFactor record 406c for ranking the association defined by the corresponding ImsiAssociation table 402 relative to other such associations, a LocationRange record 406d identifying a geographic region. for which the association defined by the corresponding ImsiAssociation table 402 is valid, and a Priority record 406e for ranking the criteria defined in this table relative to other criteria. The Priority record 406e typically includes a hexadecimal value between x00 and xFF, inclusive.

Each ImsiCriteria-LastRegistration table 408 includes an ImsiCriteriaId record 408a for linking with one of the ImsiAssociation tables 402, a MobileStationIdentifier record 408b identifying the IMEI of the user's mobile telecommunications device 10, and a RegisteredImsi record 408c identifying the IMSI provided by the user when it moved into one of the geographic regions serviced by the mobile telecommunications system 100. The RegisteredImsi record 408c is used to group together all the IMSIs that have been assigned to a common subscriber.

Each ImsiCriteria-LastRegistration table 408 also includes an ImsiCriteriaWeightFactor record 408d for ranking the association defined by the corresponding ImsiAssociation table 402 relative to other such associations, a TransferIndicator flag 408; and a Priority record 408f for ranking the criteria defined in this table relative to other criteria. The Priority record 408f typically includes a hexadecimal value between x00 and xFF, inclusive.

In the event that a subscriber has multiple IMSIs, the ImsiAssociation tables 402 might associate one of the subscriber's IMSIs with one MSISDN (eg. to originate personal calls), and associate another one of the subscriber's IMSIs with another MSISDN (eg. to originate business calls). However, the subscriber might want to dynamically prevent one of the MSISDNs (eg. the personal MSISDN) from being dynamically assigned to the associated IMSI during the provisioning of a service, and instead allow one of the other MSISDNs (eg. the business MSISDN) to be dynamically assigned to the IMSI. The TransferIndicator flag 408e allows the subscriber to dynamically specify (eg. by calling the operator of the network management system 108, or by using a USSD service from the subscriber's mobile telecommunications device 10) whether the mobile telecommunications system 100 should try to assign one particular MSISDN to an IMSI instead of another MSISDN.

Each MsIsdnAssociation. table 410 includes a MsIsdn record 410a identifying a MSISDN for call termination, and an Imsi record 410b for linking with one of the ImsiAssociation tables 402.

Each MsIsdnAssociation table 410 may be associated with one of the MsIsdnCriteria-Time tables 412, one of the MsIsdnCriteria-Location tables 414, or one of the MsIsdnCriteria-LastRegistration tables 416.

Each MsIsdnCriteria-Time table 412 includes a MsIsdnCriteriaId record 412a for linking with one of the MsIsdnAssociation tables 410, a MsIsdnCriteriaWeightFactor record 412b for ranking the association defined by the corresponding MsIsdnAssociation table 410 relative to other such associations, an AvailabilityPeriod record 412c identifying the time period during which the association defined by the corresponding MsIsdnAssociation table 410 is valid, and a Priority record 412d for ranking the criteria defined in this table relative to other criteria. The Priority record 412d typically includes a hexadecimal value between x00 and xFF, inclusive.

Each MsIsdnCriteria-Location table 414 includes a MsIsdnCriteriaId record 414a for linking with one of the MsIsdnAssooiation tables 410, a MsIsdnCriteriaWeightFactor record 414b for ranking the association defined by the corresponding MsIsdnAssociation table 410 relative to other such associations, a LocationRange record 414c identifying geographic region for which the association defined by the corresponding MsIsdnAssociation table 410 is valid, and a Priority record 414d for ranking the criteria defined in this table relative to other criteria. The Priority record 414d typically includes a hexadecimal value between x00 and xFF, inclusive.

Each MsIsdnCriteria-LastRegistration table 416 includes a MsIsdnCriteriaId record 416a for linking with one of the MsIsdnAssociation tables 410, a MsIsdnCriteriaWeightFactor record 416b for ranking the association defined by the corresponding MsIsdnAssociation table 410 relative to other such associations, and a PublishedMsIsdnIndicator record 416c indicating whether the MSISDN identified in the corresponding MsIsdnAssociation table 410 is published (i.e. the user of the mobile telecommunications device 10 allows telephone calls to the specified MSISDN to be terminated at the mobile telecommunications device 10).

The AE methods 500 include a GetReferenceImsi(Imsi) method 502, a GetBasicMsIsdn method 504, a SetImsiCriteria method 506, a GetReferenceImsi(MsIsdn) method 508, and a ResetImsiCriteria method 510. The SetImsiCriteria method 506 includes a SetImsiCriteria(Time) method, a SetImsiCriteria(Location) method, and a SetImsiCriteriaLastRegistration method. The GetReferenceImsi(MsIsdn) method 508 includes an EvaluateMsIsdnCriteria(Time) method, an EvaluateMsIsdnCriteria(Location) method, and an EvaluateMsIsdnCriteriaLastRegistration method.

The ImsiCriteria-Time tables 404, the ImsiCriteria-Location tables 406, and the ImsiCriteria-LastRegistration tables 408, together with the GetReferenceImsi(Imsi) method 502, the
GetBasicMsIsdn method 504, and the SetImsiCriteria method 506, comprise the Bra set of logic rules discussed above.

The MsIsdnCriteria-Time tables 412, the MsIsdnCriteria-Location tables 414, and the MsIsdnCriteria-LastRegistration tables 416, together with the GetReferenceImsi(MsIsdn) method 508 and the EvaluateMsIsdnCritelia methods, comprise the second set of logic rules discussed above.

The operation of the mobile telecommunications system 100 will be discussed in greater detail below, in the context of a mobile telecommunications device 10 entering a serviced geographical region, and subsequently in the context of terminating a telephone call to a mobile telecommunications device 10 located in the serviced geographical region.

Method of Operation—MsIsdnt Assignment

Figure 3:
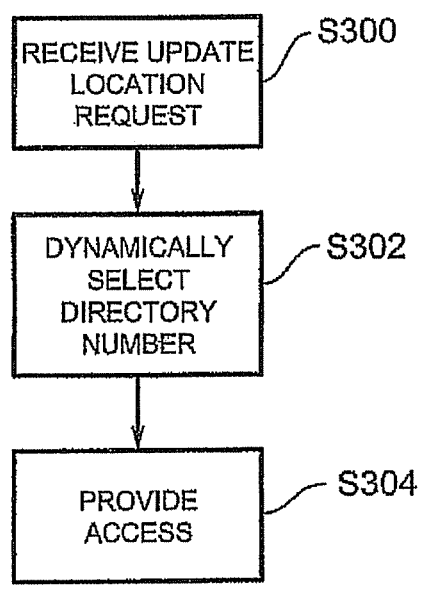
FIG. 3 is a flowchart depicting the operation of the network management system after a mobile telecommunications device roams into a visited geographical region.

FIG. 3 is a flowchart that depicts, by way of overview, the operation of the network management system 108 after a mobile telecommunications device 10 roams into a serviced geographical region.

At step S300, the network management system 108 receives a location update request, initiated by the mobile telecommunications device 10 after it roams into the serviced geographical region. The location update request includes a subscriber identity associated with the user of the mobile telecommunications device 10.

At step S302, the network management system 108 dynamically selects one of the directory numbers that are associated with the received subscriber identity by evaluating the decision tree using the received subscriber identity. Preferably, the directory number is local to the serviced geographic region into which the mobile telecommunications device 10 has roamed.

At step S304, the network management system 108 provides the mobile telecommunications device 10 with access to telecommunication services within the serviced geographic region by forwarding the selected directory number to the network subsystem 106.

Fig, 4 depicts the signal flow within the mobile telecommunications system 100 after a mobile telecommunications device 10 roams from one network subsystem 106 to another network subsystem 106. These two network subsystems 106 can be both in a home geographical region or a visited geographical region. Alternately, one of the network subsystems 106 can be in a home geographical region, with the other network subsystem 106 being in the visited geographical region.

For convenience, the following discussion will assume that the mobile telecommunications device 10 roams from a home geographical region into a visited geographical region (i.e. the subscriber associated with the mobile telecommunications device 10 is registered to receive telecommunications services from the network subsystem 106 in its home geographical region, and the mobile telecommunications device 10 roams into a geographical region that is serviced by a different network subsystem 106).

However, as will become apparent, the same methodology would apply if the mobile telecommunications device 10 roamed from a visited geographical region into a home geographical region; roamed between the network subsystems 106 of the home geographical region; or roamed between the network subsystems 106 of the visited geographical region.

At step S400, the mobile telecommunications device 10 receives the LAI (Location Area Identifier) from the base station subsystem 104 that services the geographical region into which the mobile telecommunications device 10 has roamed, and determines that it has roamed into a visited geographic region. Accordingly, at step S402, the mobile telecommunications device 10 issues a MM/Location Update message with the associated visited network subsystem 106 (The current network subsystem 106), including the LAI and IMSI previously issued to the device 10.

The current network subsystem 106 determines from the received LAI that the mobile telecommunications device 10 previously registered in. a different geographical region serviced by the mobile telecommunications system 100. At step S404, the current network subsystem 106 issues a MAP/Send Parameters message to the previous network subsystem 106 (the network subsystem 106'), including the IMSI previously issued to the mobile telecommunications device 10. Using the subscriber information stored in the VLR 120 of the network subsystem 106', the network subsystem 106' responds, at step S406, with the IMSI associated with the received IMSI.

At step S408, the current network subsystem 106 issues a MAP/Update Location message to the HLR. 122, including the received IMSI and the LAT of the current network subsystem 106, Then, at step S410, the HLR 122 invokes the GetSubscriberProfileImsi method 302 to determine the ReferenceImsi 402c that is associated with the received 111/181.

A business entity might have multiple IMSIs, all having a common subscription for telecommunications services. It is therefore convenient to allow the mobile telecommunications system 100 to associate all these IMSIs with a single subscriber identity (ReferenceImsi 402c). The GetSubscriberProfileImsi method 302 facilitates this arrangement by identifying the ReferenceImsi 402c that is associated with a specific IMSI. The HLR 122 then uses the ReferenceImsi 402c to locate the associated SubscriberProfile table 202 to determine the services to which the subscriber is entitled.

At step S412, the HLR 122 invokes the GetBasicMsIsdn method 304, which identifies the ImsiAssociation tables 402 that are associated with the received IMSI, and then selects a BasicMsIsdn 402b from the BasicMsIsdns listed in the identified ImsiAssociation tables 402. The BasicMsIsdn 402b is dynamically selected from an evaluation of the criteria specified in the ImsiCriteria-Time tables 404, InisiCriteria-Location tables 406, and ImsiCtiteria-LastRegistration tables 408 that are associated with the identified ImsiAssociation tables 402. Since one of the evaluation criteria is preferably geographical region, typically the selected BasicMsIsdn 402b is local to the geographical region into which the mobile telecommunications device 10 has roamed.

At step S414, the HLR 122 invokes the SetSubscriberStatus method 306 which updates the ActivityStatus records 404b, the RegisterLocation records 406b and the RegisteredImsi records 408c (of the ImsiCriteria-Time tables 404, the ImsiCtiteria-Location tables 406, and the ImsiCriteria-LastRegistration tables 408) that are associated with the identified ImsiAssociation tables 402, In effect, the ImsiCriteria-LastRegistration tables 408 identify the MSISDN that is currently assigned to a particular IMSI, The AE 124 maintains the MSISDN-IMSI assignment, and the IMSI-LAI association until such time as the AE 124 is requested to select another MSISDN for the same IMSI.

At step S416, the HLR 122 responds to the MAP/Location Update message by issuing a MAP/ISD (Insert Subscriber Data) message to the current network subsystem 106, including the IMSI, the BasicMsIsdn, and the services identified in the corresponding Services record 202c. In response, the VLR 120 of the current network subsystem 106 updates its subscriber information for the corresponding IMSI, and then responds to the HLR 122 with a MAP/ISD Result message, at step S418, confirming that the VLR 120 has been updated.

At step S420, the HLR 122 issues a MAP/Cancel Location message to the network subsystem 106', including the IMSI of the user of the mobile telecommunications device 10. The network subsystem 106' deletes its own subscriber information for the corresponding IMSI, and releases the IMSI previously assigned to that IMSI, The network subsystem 106' then issues a MAP/Update Location Result message to the HLR 122, at step S422, confirming deletion of this information. The HLR 122 issues a MAP/Update Location Result message to the current network subsystem 106, at step S424.

The current network subsystem 106 then causes the current base station subsystem 104 to conduct authentication and cyphering steps with the mobile telecommunications device 10. At step S426, the current network subsystem 106 generates a new IMSI for the IMSI, and issues a MM/Location Update Result message to the mobile telecommunications device 10 (via the current base station subsystem 104), including the new IMSI. The mobile telecommunications device 10 then saves the new IMSI to allow the device 10 to subsequently identify itself to the mobile telecommunications system 100.

As a result calls made from the mobile telecommunications device 10 will appear to originate from the selected BasicMsIsdn 402b.

GetsubscriberProfile(Imsi) Method 302 and GetReferenceImsi(Imsi) Method 502

Figure 5:
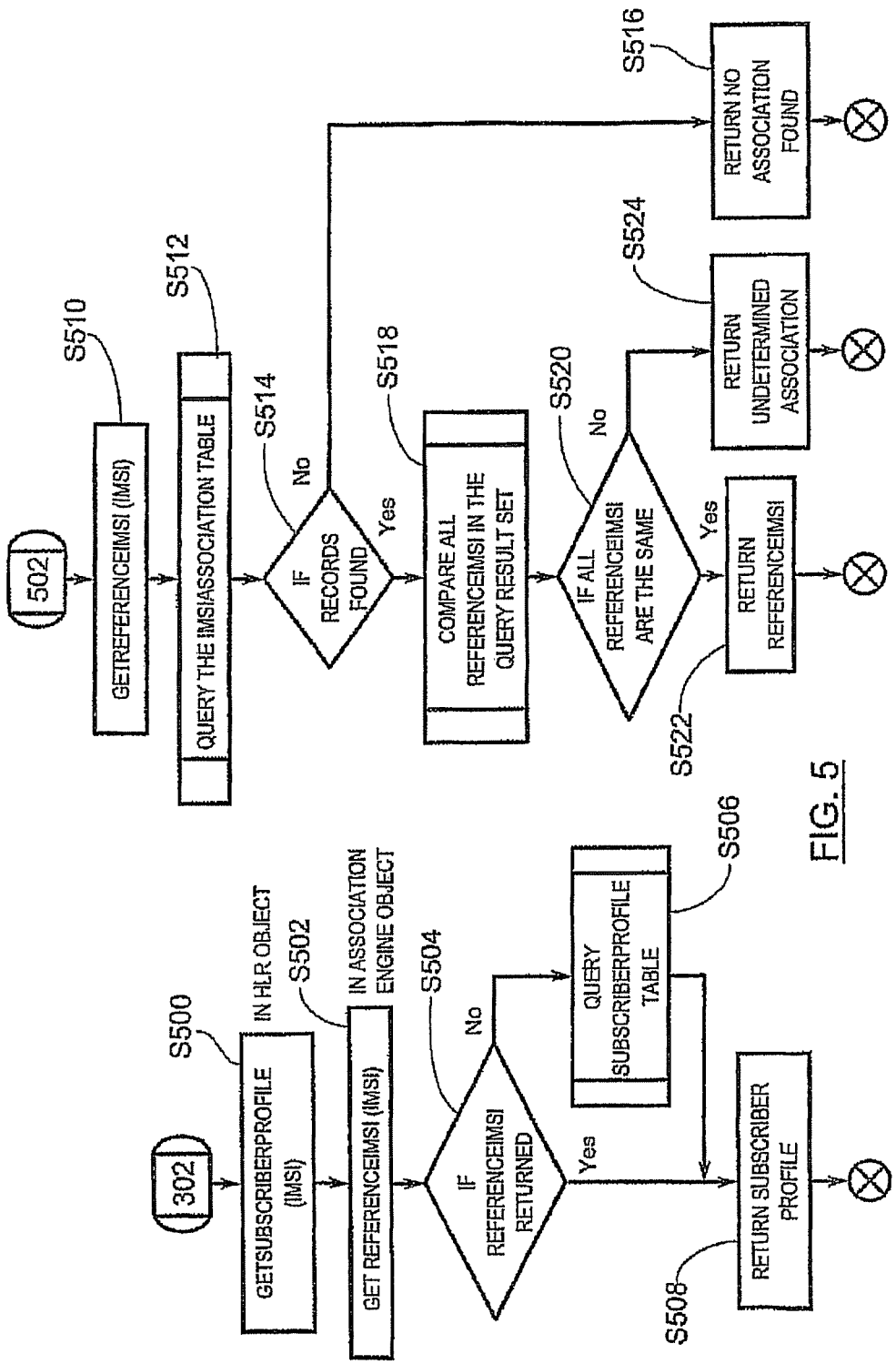
FIG. 5 is a flowchart depicting the operation of the GetSubscriberProfileImsi method and the GetReferenceImsi (Imsi) method of the network management system.

FIG. 5 is a flowchart that depicts the operation of the GetSubscriberProfileImsi method 302 and the GetReferenceImsi(Imsi) method 502. These two methods allow the mobile telecommunications system 100 to associate more than one MSISDN with a single subscriber identity (IMSI).

The EvaluateMsIsdnCriteria(Imsi) method 302 begins at step S500, and proceeds to invoice the GetReferenceImsi (Imsi) method 502 at step S502.

The GetReferenceImsi(Imsi) method 502 begins at step S510. At step S512, the GetReferenceImsi(Imsi) method 502 queries the ImsiAssociation tables 400 for all tables 400 associated with the received IMSI. At step S514, the GetReferenceImsi(Imsi) method 502 determines whether any associations for the received IMSI exist. If not, the GetReferenceImsi(Imsi) method 502 returns without any ReferenceImsi, at step S516.

Otherwise, the GetReferenceImsi(Imsi) method 502 determines, at steps S518, S520, whether the identified tables all listed the same ReferenceImsi 402c. If the identified tables all listed the same ReferenceImsi 402c, the GetReferenceImsi (Imsi) method 502 returns the ReferenceImsi 402c, at step S522. Otherwise, the GetReferenceImsi(Imsi) method 502 returns without any ReferenceImsi, at step S524.

Then, at step S504, the GetSubscriberProfileImsi method 302 determines whether the GetReferenceImsi(Imsi) method 502 returned a ReferenceImsi. If so, GetSubscriberProfileImsi method 302 returns the ReferenceImsi 402c, at step S508. Otherwise, the EvaluateMsIsdnCriteria(Imsi) method 302 returns the ReferenceImsi 202a from the SubscriberProfile table 302, at step S506.

GetBasicMsIsdn Method 304 and GetBasicMsIsdn Method 504

Figure 6:
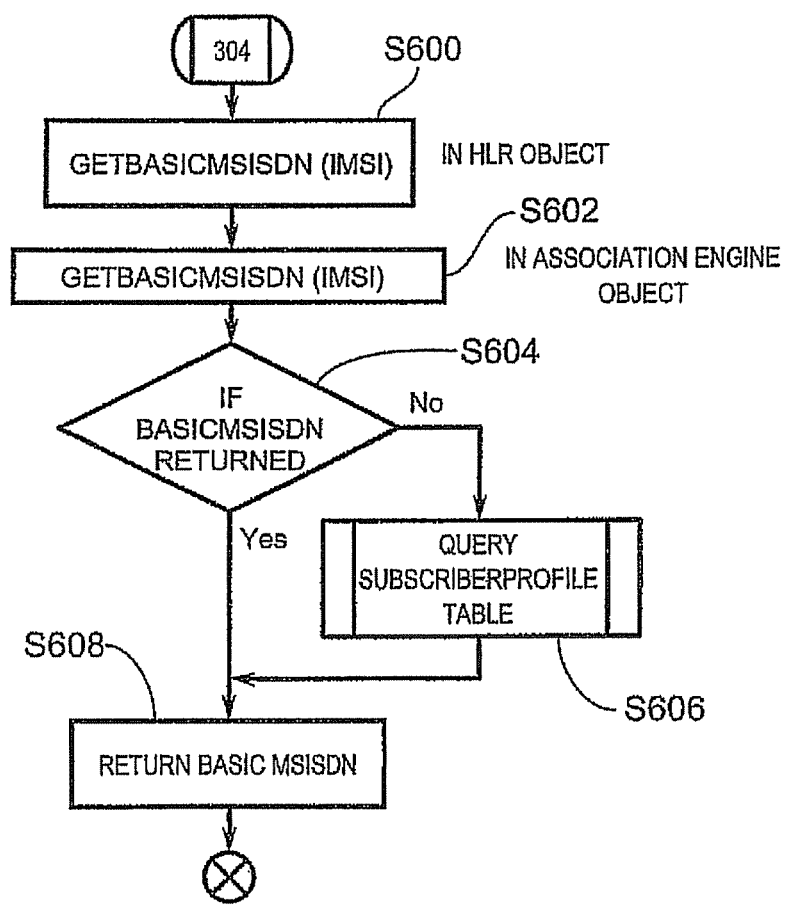
FIG. 6 is a flowchart depicting the operation of the GetBasicMsIsdn method and the GetBasicMsIsdn method of the network management system.
Figure 6:
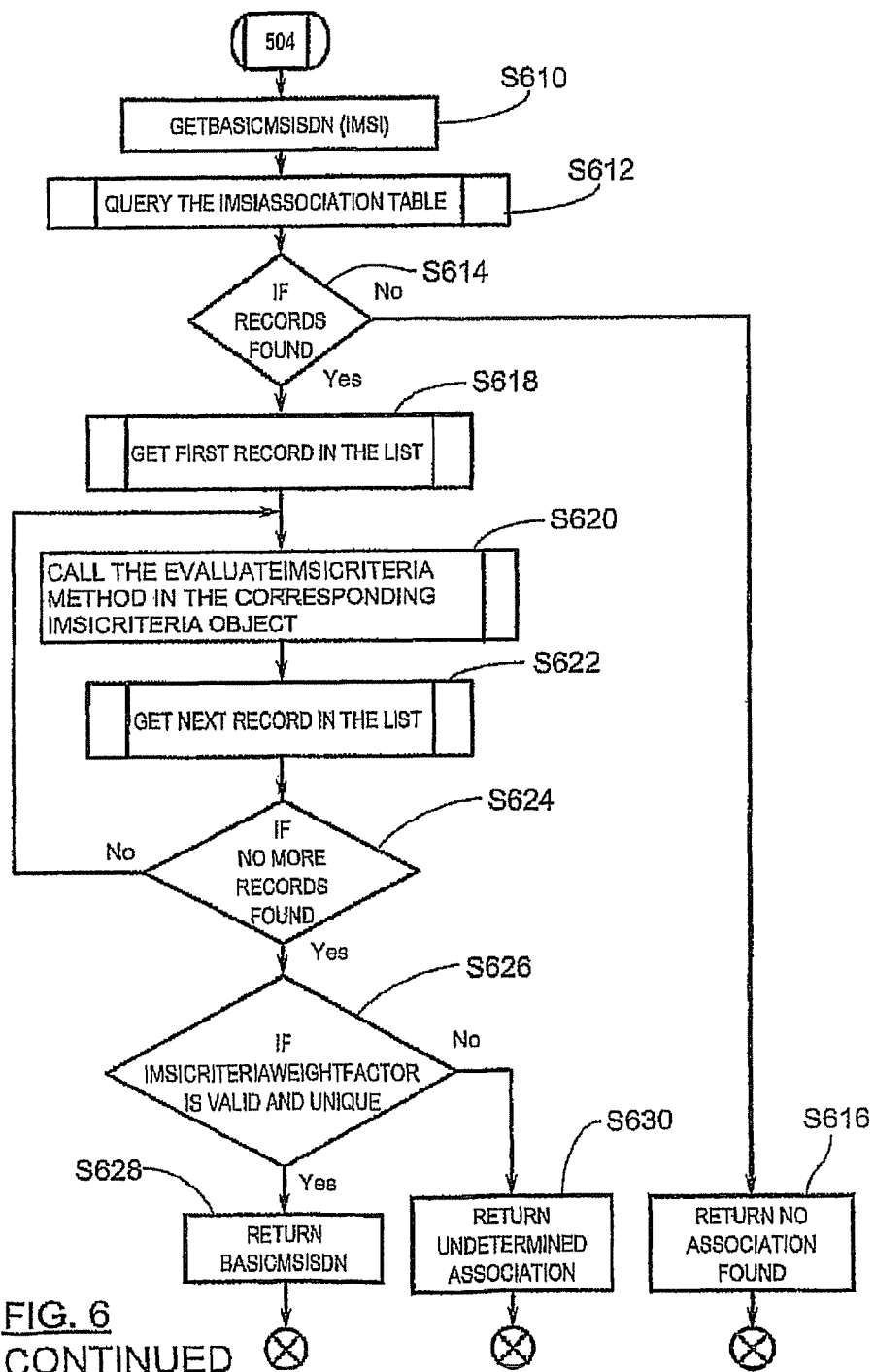

FIG. 6 is a flowchart that depicts the operation of the GetBasicMsIsdn method 304 (of the HLR 122) and the GetBasicMsIsdn method 504 (of the AE 124). These two methods allow the mobile telecommunications system 100 to dynamically select one MSISDN (BasicMsIsdn) from a list of MSISDNs (BasicMsIsdns) that are associated with an IMSI (ReferenceImsi), based on evaluation criteria (such as current geographical region of the mobile telecommunications device 10, the time instant of a location update request, the next available MSISDN in. a list of MSISDNs, and membership of the subscriber in a group).

The GetBasicMsIsdn method 304 begins at step S600, and proceeds to invoke the GetBasicMsIsdn method 504 at step S602.

The GetBasicMsIsdn method 504 method 508 begins at step S610. At step S612, the GetBasicMsIsdn method 504 queries the ImsiAssociation tables 402 for all tables 402 associated with the received IMSI. At step S614, the GetBasicMsIsdn method 504 determines whether any associations for the received IMSI exist. If not, the GetBasicMsIsdn method 504 returns without any BasicMsIsdn, at step S616.

Otherwise, the GetBasicMsIsdn method 504 evaluates all the IMSI criteria parameter tables (the ImsiCriteria-Time tables 404, the ImsiCriteria-Location tables 406, and the ImsiCriteria-LastRegistration tables 408) associated with the identified ImsiAssociation tables 402, at steps S618 to S624. To do so, the GetBasicMsIsdn method 504 repeatedly invokes the EvaluateImsiCriteria(Time) method (if the criteria is time), the EvaluateImsiCriteria(Location) method (if the criteria is location), and the EvaluateImsiCriteriaLastRegistration method (if the criteria is last registration), at step S620. These three methods (discussed below with reference to FIGS. 7 to 9) calculate values for the ImsiCriteriaWeightFactor records 404*c*, 406*c*, 408*d* for each of the IMSI criteria parameter tables.

After all the IMSI criteria parameter tables have been evaluated, at step S626, the GetBasicMsIsdn method 504 attempts to identify the BasicMsIsdn 402*b* associated with the maximum calculated ImsiCriteriaWeightFactor. If the GetBasicMsIsdn method 504 is able to identify a maximum irnsiaiteriaWeightFactor, using the ImsiAssociation table 402 the GetBasicMsIsdn method 504 returns the BasicMsIsdn 402*b* associated with the maximum ImsiCriteriaWeightFactor, at step S628, Otherwise, the GetBasicMsIsdn method 504 returns no BasicMsIsdn, at step S630.

Then, at step S604, the GetBasicMsIsdn method 304 determines whether the GetBasicMsIsdn method 504 returned a BasicMsIsdn. If so, the GetBasicMsIsdn method 304 returns the BasicMsIsdn 402*b*, at step S608. Otherwise, using the received IMSI the GetBasicMsIsdn method 304 returns the BasicReferenceMsIsdn 202*b* from the SubscriberProfile table 302, at step S606.

EvaluateImsiCriteria(Time) Method

Figure 7:
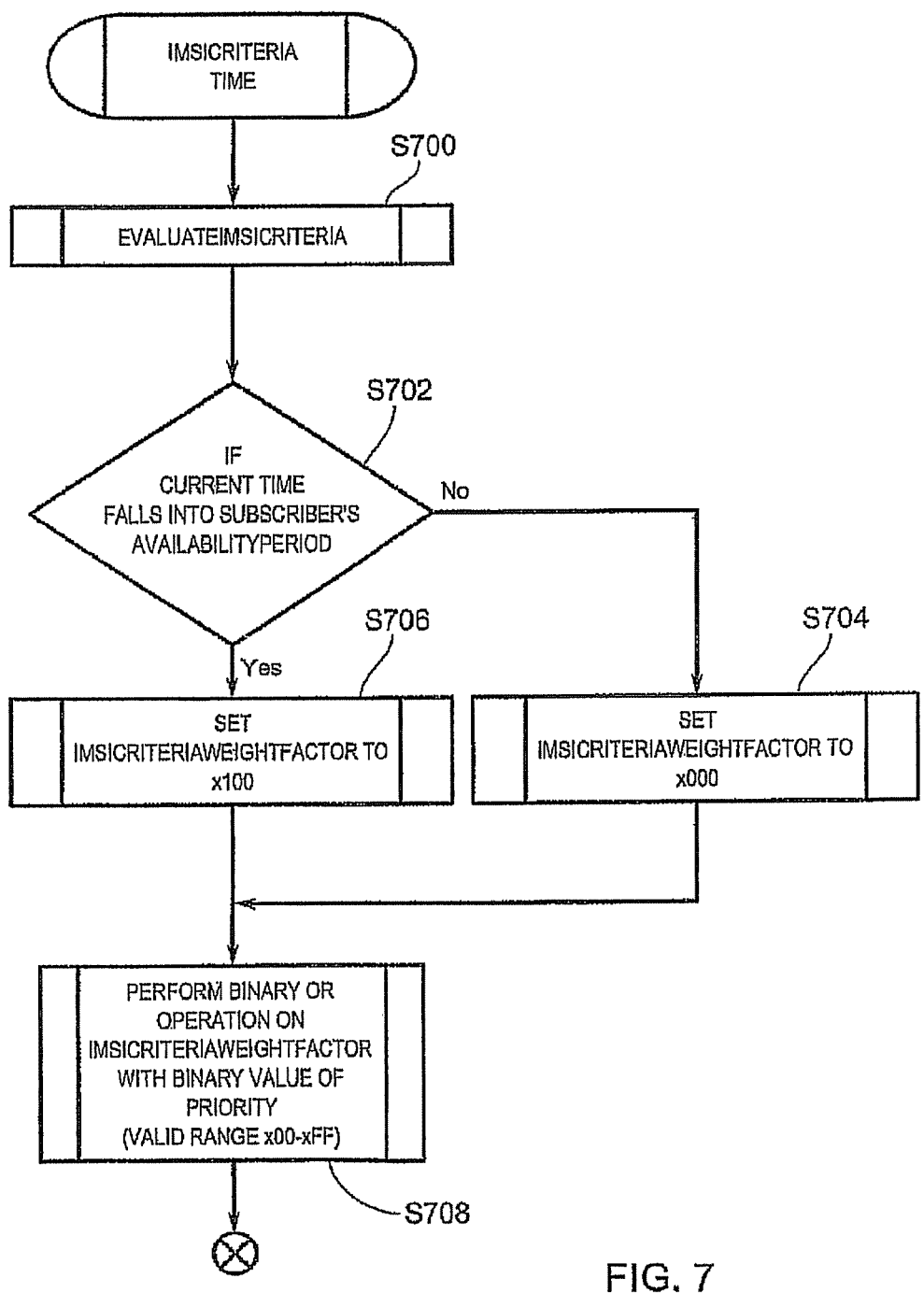
FIG. 7 is a flowchart depicting the operation of the EvaluateImsiCriteria(Time) method of the network management system.

FIG. 7 is a flowchart that depicts the operation of the EvaluateImsiCriteria(Time) method. This method calculates the ImsiCriteriaWeightFactor record 404*c* of the ImsiCriteria-Time table 404 that is associated with the received IMSI.

The EvaluateImsiCriteria(Time) method begins at step S700. At step S702, the EvaluateImsiCriteria(Time) method locates the ImsiCriteria-Time table 404 associated with the received IMSI, and then determines whether the current time is within the time period specified in the AvailabilityPeriod record 404*d* of the located ImsiCriteria-Time table 404. If the current time is within the specified time period, at step S706, the EvaluateImsiCriteria(Time) method sets ImsiCriteriaWeightFactor=x100. Otherwise, at step S704, the EvaluateImsiCriteria(Time) method sets ImsiCriteriaWeightFactor=x000. The EvaluateImsiCriteria (Time) method saves the value of the ImsiCriteriaWeightFactor in the ImsiCriteriaWeightFactor record 404*c*.

At step S708, the EvaluateImsiCriteria(Time) method performs a binary OR operation on the ImsiCriteriaWeightFactor record 404*c* and the Priority record 404*e*, and saves the result in the ImsiCriteriaWeightFactor record 404*c*. As a result, the GetBasicMsIsdn method 504 will give the BasicMsIsdn 402*b* associated with the located ImsiCriteria-Time table 402 a higher priority if the criteria specified in the located ImsiCriteria-Time table 402 is met, than if the specified criteria is not met.

EvaluateImsiCriteria(Location) Method

Figure 8:
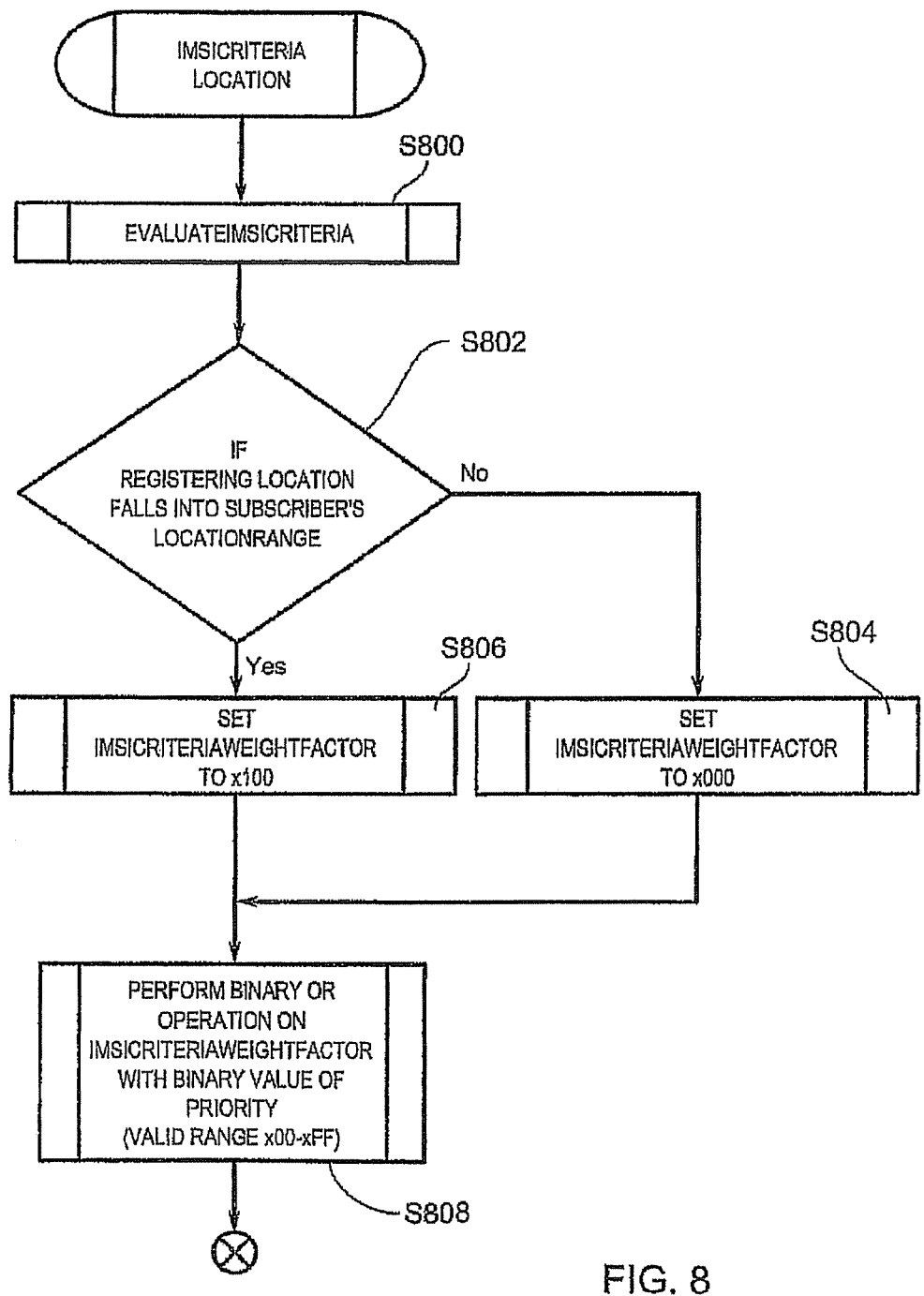
FIG. 8 is a flowchart depicting the operation of the EvaluateImsiCriteria(Location) method of the network management system.

FIG. 8 is a flowchart that depicts the operation of the EvaluateImsiCriteria(Location) method.

This method calculates the ImsiCriteriaWeightFactor record 406*c* of the ImsiCriteria-Location table 406 that is associated with the received IMSI.

The EvaluateImsiCriteria(Location) method begins at step S800. At step S802, the EvaluateImsiCriteria(Location) method locates the ImsiCriteria-Location table 406 associated with the received IMSI. The EvaluateImsiCriteria(Location) method also determines the current location of the mobile telecommunications device 10 from the LAI of the current network subsystem 106, and then determines whether the current location is within the geographical region specified in the LocationRange record 406*d* of the located ImsiCriteria-Location table 406.

If the current location is within the specified LocationRange 406*d*, at step S806, the EvaluateImsiCriteria(Location) method sets ImsiCriteriaWeightFactor =x100. Otherwise, at step S804, the EvaluateImsiCriteria(Location) method sets ImsiCriteriaWeightFactor x000. The EvaluateImsiCriteria(Location) method saves the value of the ImsiCriteriaWeightFactor in the ImsiCriteriaWeightFactor record 404*c*.

At step S808, the EvaluateImsiCriteria(Location) method performs a binary OR operation on the ImsiCriteriaWeightFactor record 404*c* and the Priority record 406*e*, and saves the result in the ImsiCriteriaWeightFactor record 404*c*. As a result, the GetBasicMsIsdn method 504 will give the BasicMsIsdn 402*b* associated with the located ImsiCriteria-Location table 406 a higher priority if the criteria specified in the located ImsiCriteria-Location table 406 is met, than if the specified criteria is not met.

EvaluateImsiCriteria(LastRegistration) Method

Figure 9:
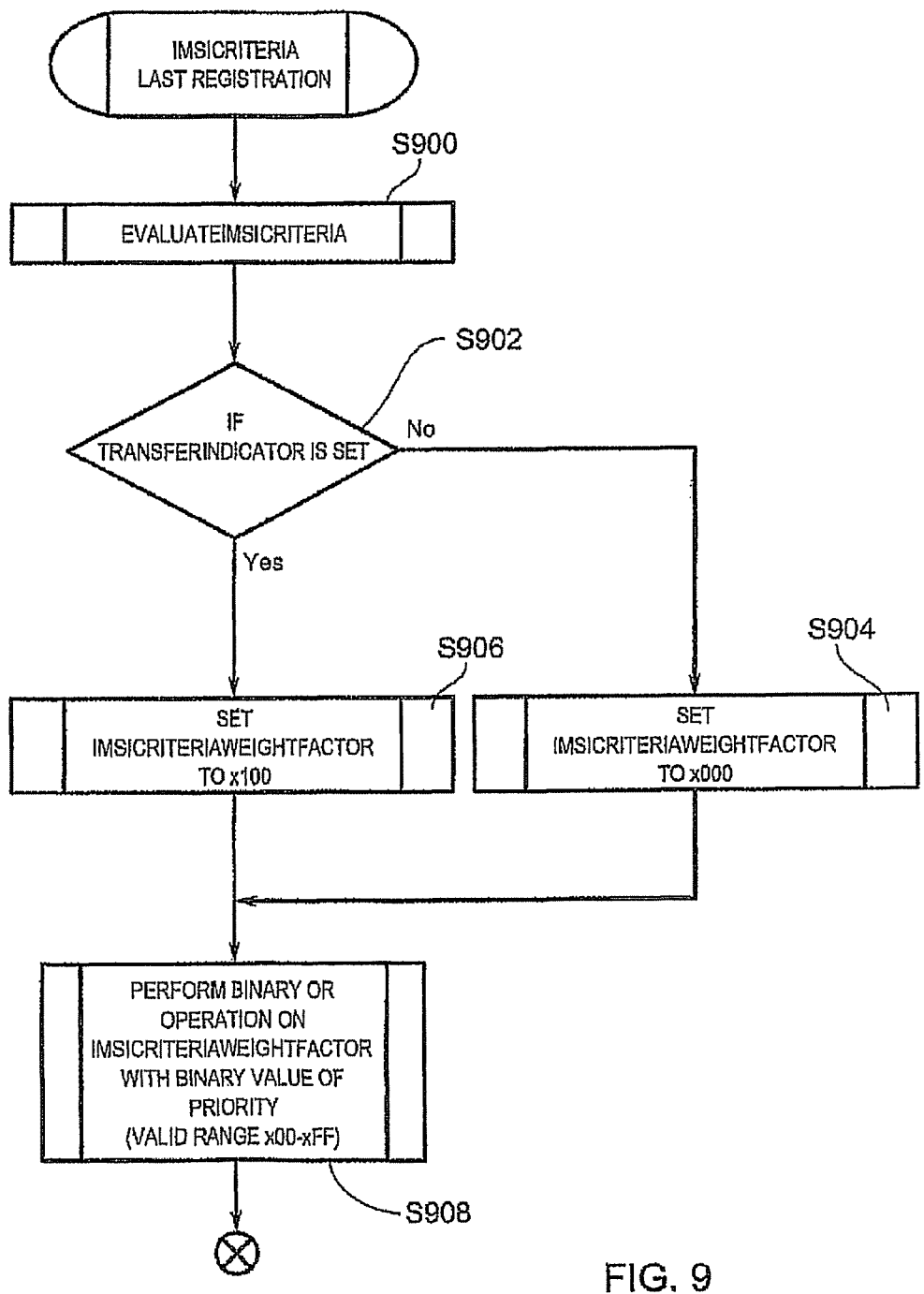
FIG. 9 is a flowchart depicting the operation of the EvaluateImsiCriteria(LastRegistration) method of the network management system.

FIG. 9 is a flowchart that depicts the operation of the EvaluateImsiCriteria(LastRegistration) method. This method calculates the ImsiCriteriaWeightractor record 408*d* of the ImsiCriteria-LastRegistration tables 408 that is associated with the received IMSI.

The EvaluateImsiCriteria(LastRegistration) method begins at step S900. At step S902, the EvaluateImsiCriteria (LastRegistration) method locates the ImsiCriteria-LastRegistration table 408 associated with the received IMSI, and then determines whether the TransferIndicator 408*e* flag has been set (i.e. telephone calls using the mobile telecommunications device 10 having the received IMSI from the associated MSISDN are authorized).

If the TransferIndicator 408*e* flag has been set, at step S906, the EvaluateImsiCriteria(LastRegistration) method sets ImsiCriteriaWeightFactor=x100. Otherwise, at step S904, the EvaluateImsiCriteria(LastRegistration) method sees ImsiCriteriaWeightFactor=x000. The EvaluateImsiCriteria (LastRegistration) method saves the value of the ImsiCriteriaWeightFactor in the ImsiCriteriaWeightFactor record 408*d*.

At step S908, the EvaluateImsiCriteria(LastRegistration) method performs a binary OR operation on the ImsiCriteriaWeightFactor record 408*d* and the Priority record 408*f*, and saves the result in the ImsiCriteriaWeightFactor record 408d. As a result, the GetBasicMsIsdn method 504 will give the BasicMsIsdn 402b associated with the located ImsiCriteria-LastRegistration table 408 a higher priority if the criteria specified in the located ImsiCriteria-LastRegistration table 408 is met, than if the specified criteria is not met.

SetSubScriberStatus Method 306 and SetImsiCriteria Method 506

Figure 10:
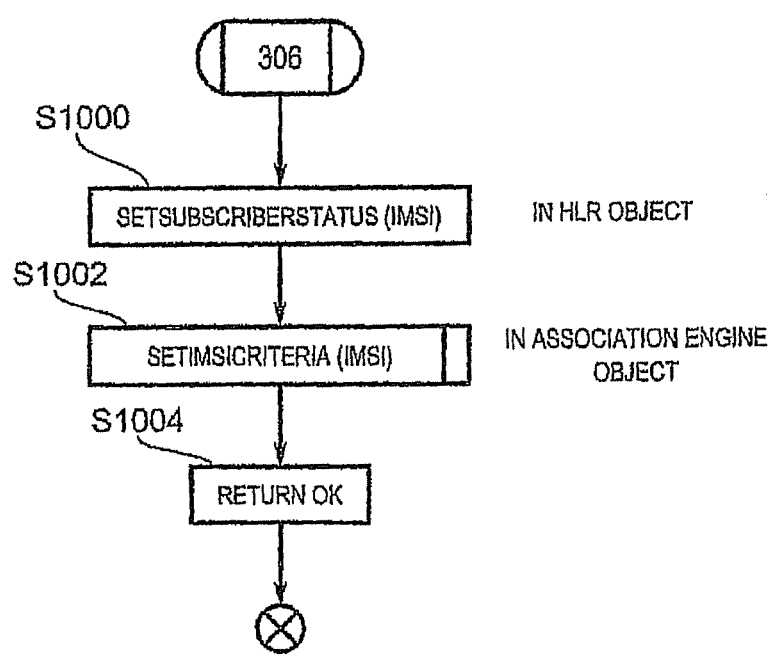
FIG. 10 is a flowchart depicting the operation of the SetSubscriberStatus method and the SetImsiCriteria method of the network management system.
Figure 10:
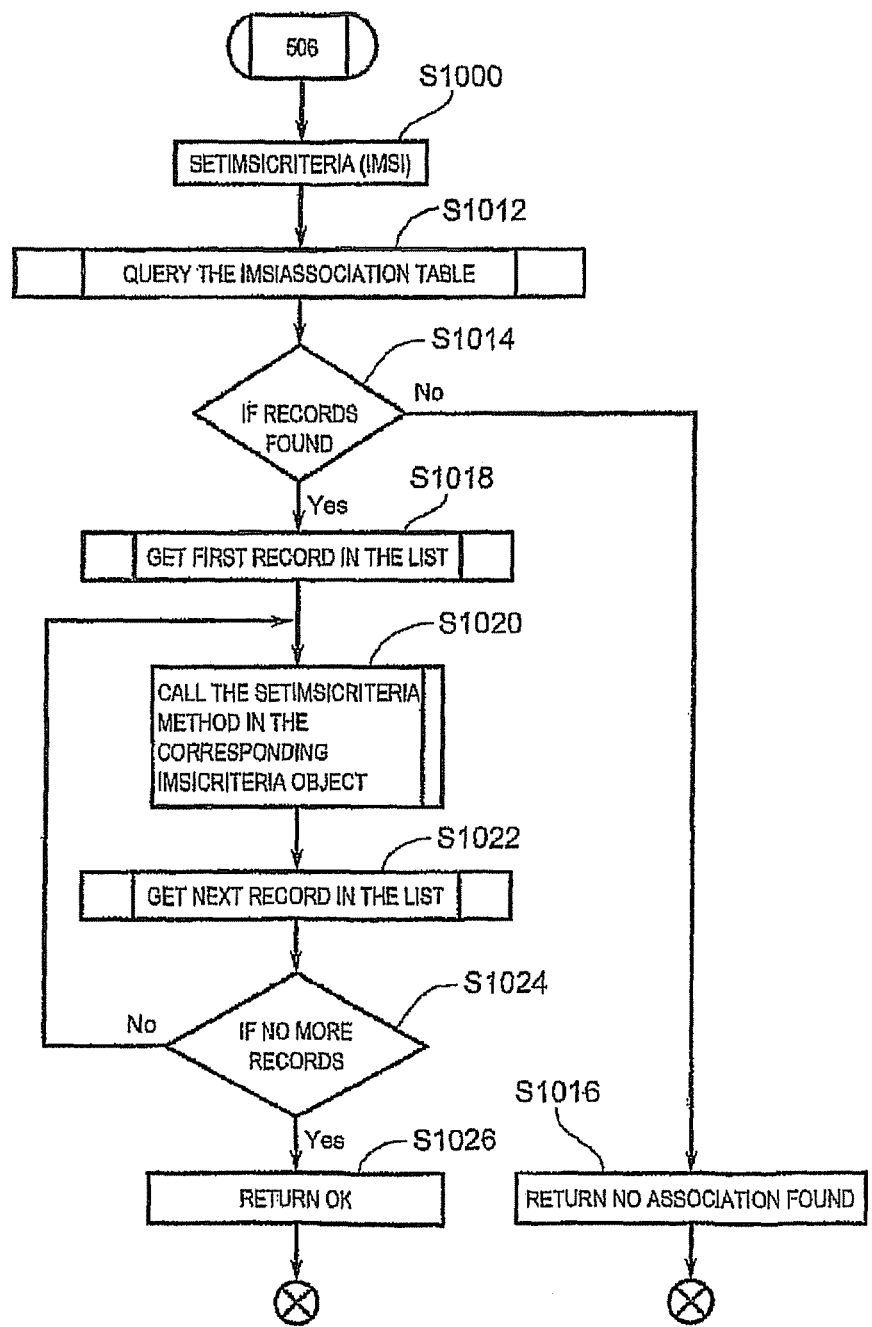

FIG. 10 is a flowchart that depicts the operation of the SetSubscriberStatus method 306 and the SetImsiCriteria method 506. These two methods allow the mobile telecommunications system 100 to populate the IMSI criteria parameter tables (the ImsiCriteria-Time tables 404, the InisiCriteria-Location tables 406, and the ImsiCriteria-LastRegistration tables 408).

The SetSubscriberStatus method 306 begins at step S1000, and proceeds to invoke the SetImsiCriteria method 506 at step S1002.

The SetImsiCriteria method 506 begins at step S1010. At step S1012, the SetImsiCriteria method 506 queries the ImsiAssociation tables 400 for all tables 400 associated with the received IMSI. At step S1014, the SetImsiCriteria method 506 determines whether any associations for the received IMSI exist. If not, the SetImsiCriteria method 506 simply returns, at step S1016. Otherwise, the SetImsiCriteria method 506 populates all the IMSI criteria parameter tables associated with the identified ImsiAssociation tables 400, at steps S1018 to S1024. To do so, the SetImsiCriteria method 506 repeatedly invokes the SetImsiCriteria(Time) method, the SetImsiCriteria(Location) method, and the SetImsiCriteriaLastRegistration method, at step S1020. These latter three methods are discussed below, with reference to FIGS. 11, 12 and 13.

Once all the corresponding IMSI criteria parameter tables have been populated, SetImsiCriteria method 506 returns at step S1026. The SetSubscriberStatus method 306 then returns at step S1004.

SetImsiCriteria Methods

Figure 11:
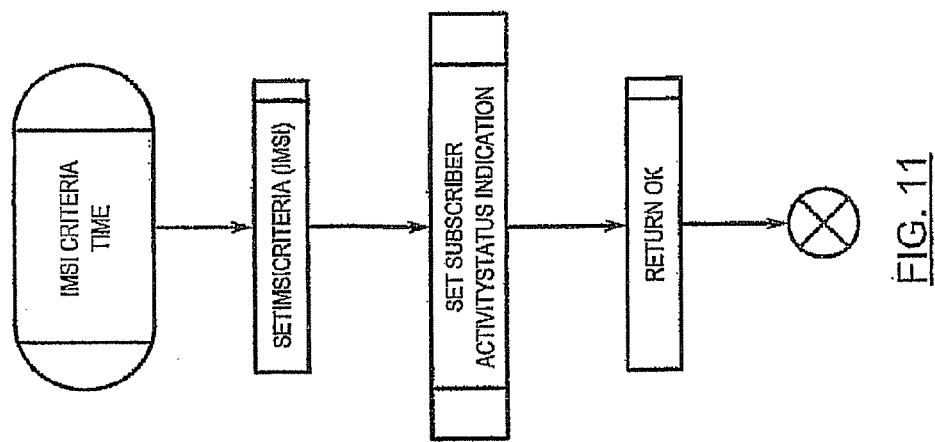
FIG. 11 is a flowchart depicting the operation of the SetImsiCriteria(Time) method of the network management system.

FIG. 11 is a flowchart that depicts the operation of the SetImsiCriteria(Time) method, This method sets the ActivityStatus flag 404b of the ImsiCriteria-Time table 404 that is associated with the received IMSI.

Figure 12:
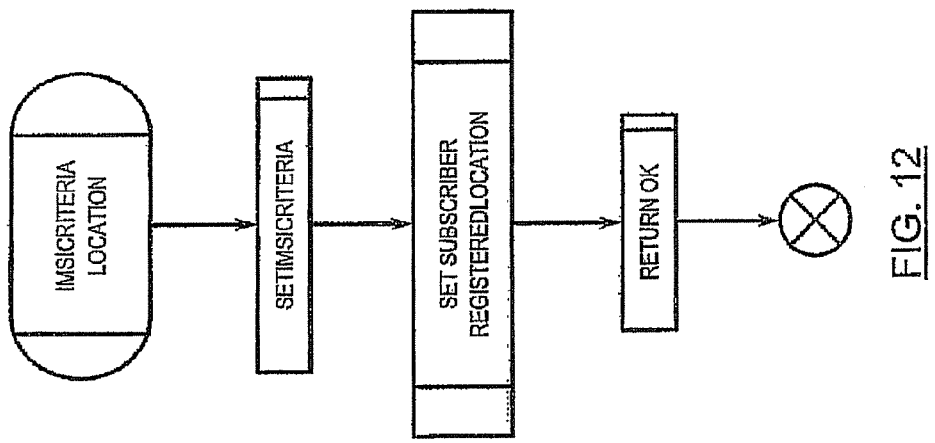
FIG. 12 is a flowchart depicting the operation of the SetImsiCriteria(Location) method of the network management system.

FIG. 12 is a flowchart that depicts the operation of the SetImsiCriteria(Location) method. This method sets the RegisteredLocation record 406b of the ImsiCriteria-Location table 406 that is associated with the received IMSI.

Figure 13:
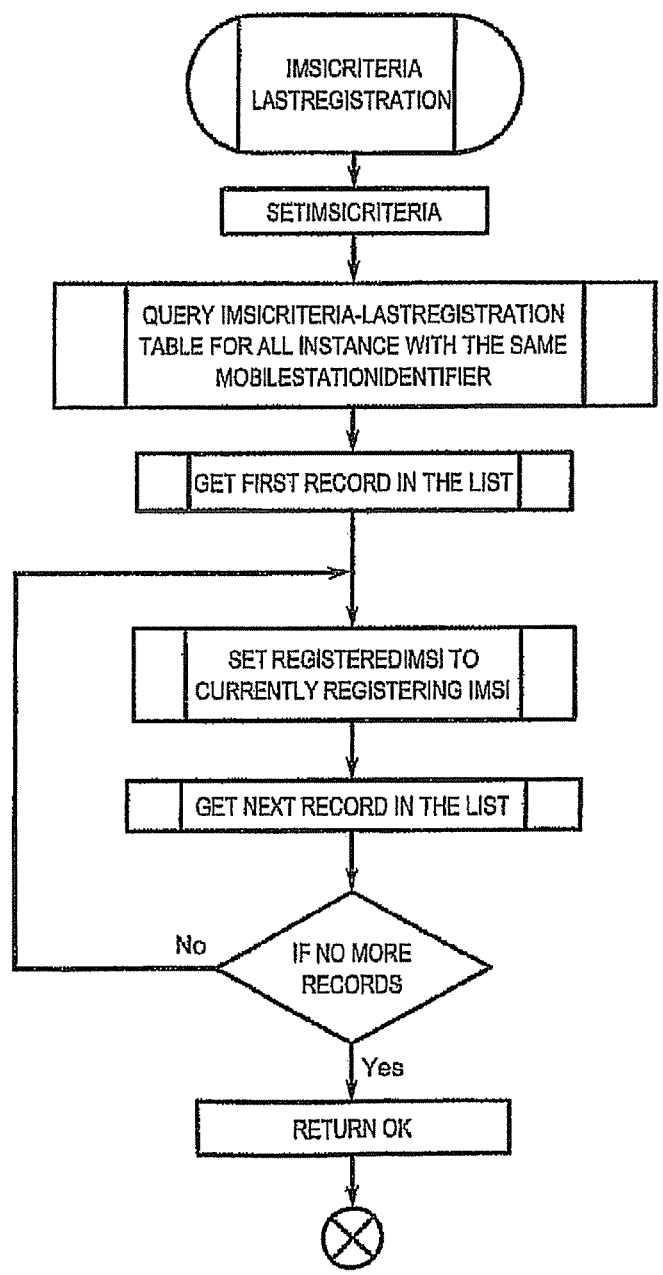
FIG. 13 is a flowchart depicting the operation of the SetImsiCriteria(LastRegistration) method of the network management system.

FIG. 13 is a flowchart that depicts the operation of the SetImsiCriteria(LastRegistration) method, This method identifies all the ImsiCriteria-LastRegistration tables 408 associated with the received IMSI that have the same MobileStationIdentifler 408b, and sets the RegisteredImsi record 408c of each of these tables 408 to the received IMSI. In the situation where a group of IMSIs are associated with a single subscriber identity (ReferenceImsi 402c), this method allows the mobile telecommunications system 100 to identify the IMSI of the last mobile telecommunications device 10 that roamed into the visited and/or home geographical region. The mobile telecommunications system 100 uses this information when terminating a telephone call to a mobile telecommunications device 10.

ResetSubScriberStatus Method 310 and ResetImsiCriteria Method 510

The ResetSubscriberStatus method 310 and the ResetImsiCriteria method 510 serve to the reset or unpopulate the IMSI criteria parameter tables aftert the mobile telecommunications device 10 leaves the visited geographical region. The ResetImsiCriteria method 510 includes a SetImsiCriteria (Time) method, a SetImsiCriteria(Location) method, and a SetImsiCriteriaLastRegistration method. As the ResetSubscriberStatus method 310 and the ResetImsiCriteria method 510 operate in a similar fashion respectively as the the SetSubscriberStatus method 306 and the SetImsiCriteria method 506, no further description of these methods is required.

Method of Operation—Imsi Assignment

Figure 14:
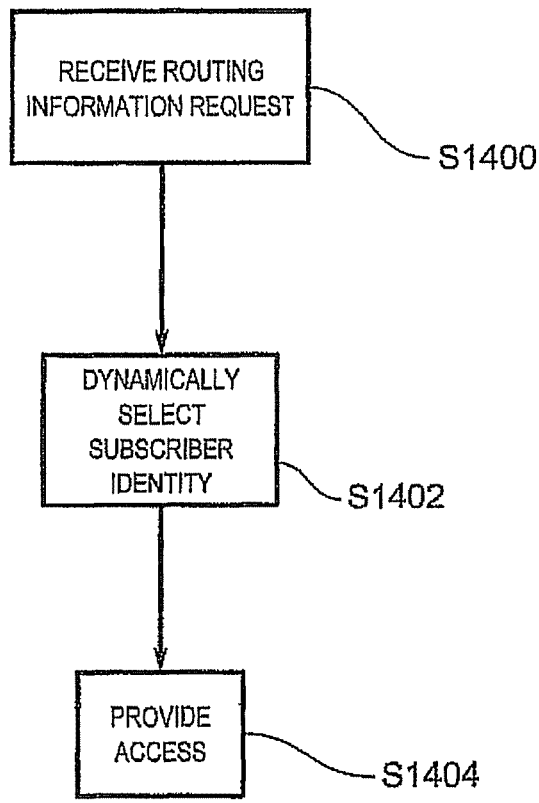
FIG. 14 is a flowchart depicting the operation of the network management system when terminating a telephone call to a mobile telecommunications device located in a visited geographical region.

FIG. 14 is a flowchart that depicts, by way of overview, the operation of the network management system 108 when terminating a telephone call to a mobile telecommunications device 10 located in a serviced geographical region.

At step S1400, the network management system 108 receives a routing information request for terminating a communication with a mobile telecommunications device 10 within the serviced geographical region. The routing information request includes a directory number that is local to the geographic region in which the mobile telecommunications device 10 is now located.

At step S1402, the network management system 108 dynamically selects one of the subscriber identities that axe associated with the received directory number by evaluating the decision tee using the received directory number.

At step S1404, the network management system 108 provides the mobile telecommunications device 10 with access to telecommunication services within the serviced geographic region by forwarding the selected subscriber identity to the network subsystem 106.

Figure 15:
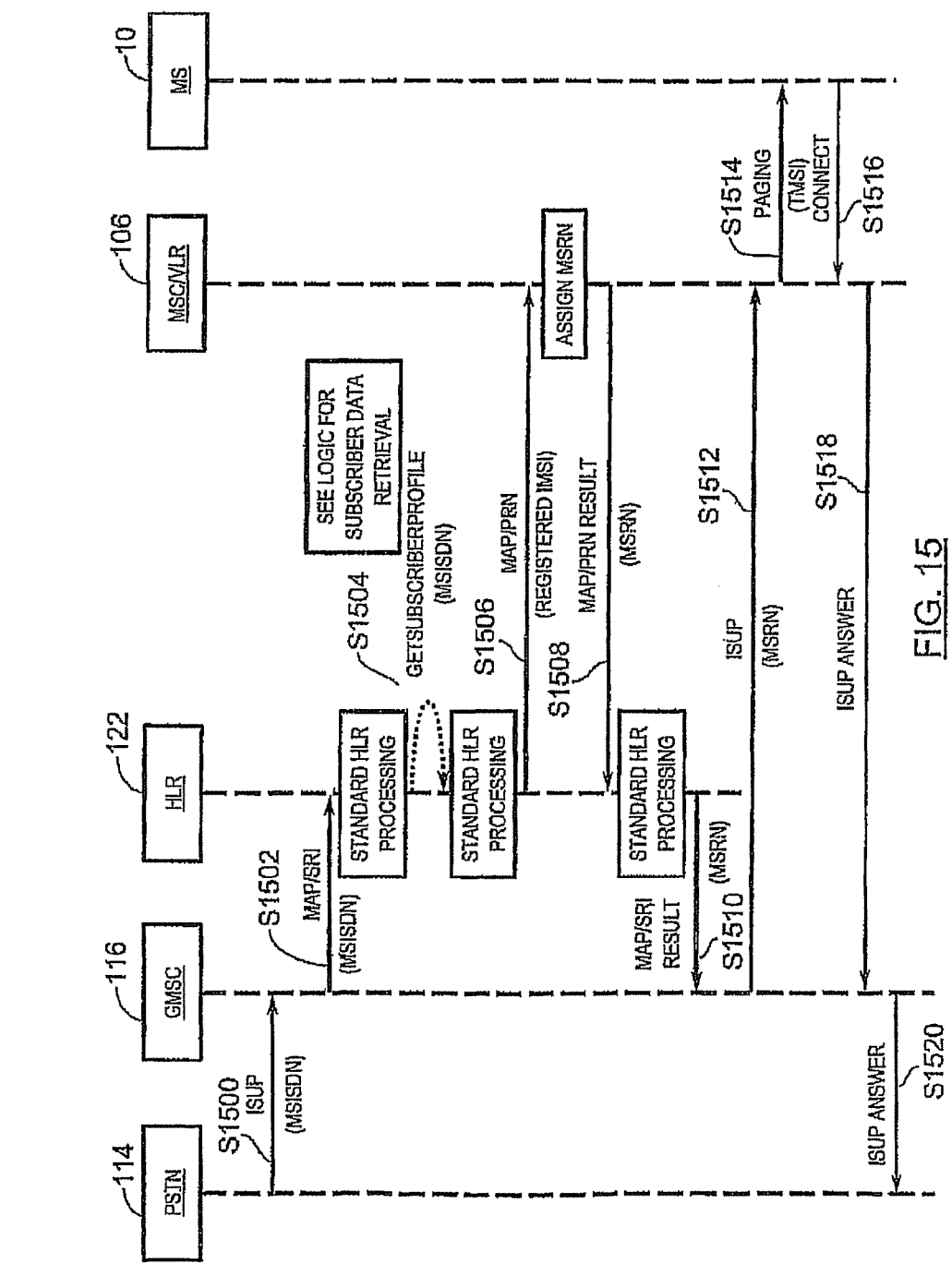
FIG. 15 is a signal flow diagram depicting the operation of the mobile telecommunications system when terminating a telephone call to a mobile telecommunications device located in a visited geographical region.

FIG. 15 depicts the signal flow in the mobile telecommunications system 100 when terminating a telephone call to a mobile telecommunications device 10 that is located in a serviced geographical region.

As discussed above, with respect to FIG. 4, the mobile telecommunications device 10 might be located in its home geographical region; or might be located in a visited geographical region. For convenience, the following discussion will assume that the mobile telecommunications device 10 has roamed from a home geographical region into a visited geographical region. However, as will become apparent, the same methodology would apply if the mobile telecommunications device 10 roamed from a visited geographical region into a home geographical region; roamed between the network subsystems 106 of the home geographical region; or roamed between the network subsystems 106 of the visited geographical region.

At step S1500, a person originates a telephone call from the PSTN 114 by dialing a MSISDN. In response, the PSTN 114 issues an ISUP (ISDN User Part) Initial Address message to the GMSC 116 of the mobile telecommunications system 100, including the dialed MSISDN. At step S1502, the GMSC 116 issues a MAP/SRI (Send Routing Information) message to the HLR 122, including the dialed MSISDN.

At step S1504, the HLR 122 invokes the EvaluateMsIsdn-Criteria(MsIsdn) method 308, which identifies the MsIsdu-Association tables 410 that are associated with the received MSISDN, and then selects a ReferenceImsi 402c from the IMSIs that are associated (via the ImsiAssociation tables 402) with the identified MsIsdnAssociation tables 410. The ReferenceImsi 402c is dynamically selected from an evaluation of the criteria specified in the MsIscluCriteria-Time tables 412, MsIsdnCriteria-Location tables 414, and MaIsdnCriteria-LastRegistration tables 416 that are associated with the identified MsIsdnAssociation tables 410, Since one of the evaluation criteria is preferably geographical region, typically the selected ReferenceImsi 4020 is associated with a mobile telecommunications device 10 that is currently located in a geographical region for which the MSISDN is a local telephone number.

The HLR 122 then uses the ReferenceImsi 402c to locate the associated SubscriberProfile table 202 to determine the services to which the subscriber is entitled. In addition, in the event that multiple IMSIs are associated with the selected ReferenceImsi 402c, the HLR 122 queries the ImsiAssociation tables 402 with the selected ReferenceImsi 402c, and identifies the corresponding. RegisteredImsi 408c from the associated InisiCriteria-LastRegistration tables 408. In the event that only one IMSI is associated with the selected ReferenceImsi 402c, the RegisteredImsi 408c will be the same as the ReferenceImsi 402c so that no such query will be necessary.

Further, as discussed above, the AE 124 maintains the MSISDN-IMSI assignment, and the IMSI-LAI association until such time as the AE 124 is requested to select another MSISDN for the same IMSI. Accordingly, at step S1506, the HLR 122 uses the RegisteredImsi 408c to determine the LAI of the network subsystem 106 with which the IMSI is currently registered, and then issues a MAP/PRN (Provide Roaming Number) message to that network subsystem 106, including the RegisteredImsi 408c.

The network subsystem 106 assigns a temporary MSRN (Mobile Station Roaming Number) to the received RegisteredImsi 408c. The network subsystem 106 also updates its subscriber profile for the RegisteredImsi 408c, by associating the MSRN with the IMSI assigned to the RegisteredImsi 408c. At step S1508, the network subsystem 106 responds to the HLR 122 with a MAP/PRN Result message, including the MSRN. At step S1510, the HLR 122 responds to the MAP/SRI message by issuing a SRI Result message to the GMSC 116, including the MSRN.

At step S1512, the GMSC 116 issues an ISUP Initial Address message to the network subsystem 106, including the received MSRN. Using the subscriber information stored in the VLR 120 of the network subsystem 106, the network subsystem 106 determines the IMSI associated with the MSRN. Then, at step S1514, the network subsystem 106 issues a RR/Paging message (via the base station subsystem 104), including the IMSI.

Each mobile telecommunications device 10 that receives the RR/Paging message compares its IMSI with the IMSI received at step S1514. The mobile telecommunications device 10 that was assigned the matching IMSI, issues a RR/Page Response message to the network subsystem 106. The network subsystem 106 initiates call setup procedures with the mobile telecommunications device 10, causing the mobile telecommunications device 10 to ring.

At step S1516, the mobile telecommunications device 10 issues a CC/Connect message to the network subsystem 106. The network subsystem 106 then issues an ISUP Answer message to the GMSC 116, at step S1518. The GMSC 116 then issues an ISUP Answer message to the PSTN 114, at step S1520, thereby completing call termination.
GetSubScriberProfile(MsIsdn) Method 308 and GetReferenceImsi(MsIsdn) Method 508

Figure 16:
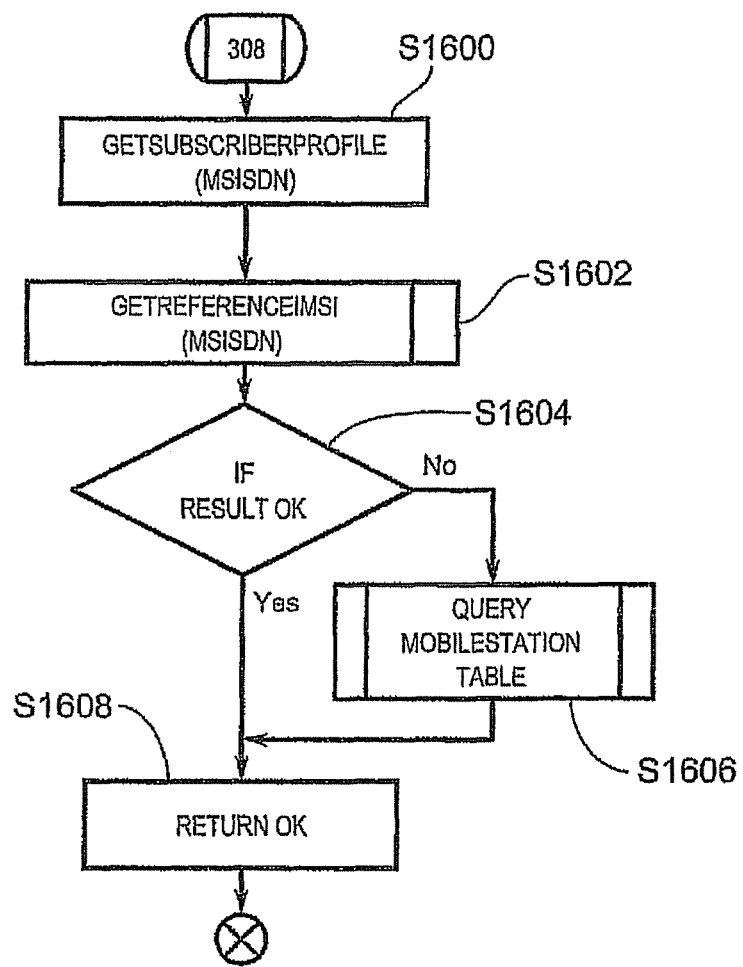
FIG. 16 is a flowchart depicting the operation of the EvaluateMsIsdnCriteria(MsIsdn) method and the GetReferenceImsi(MsIsdn) method of the network management system.
Figure 16:
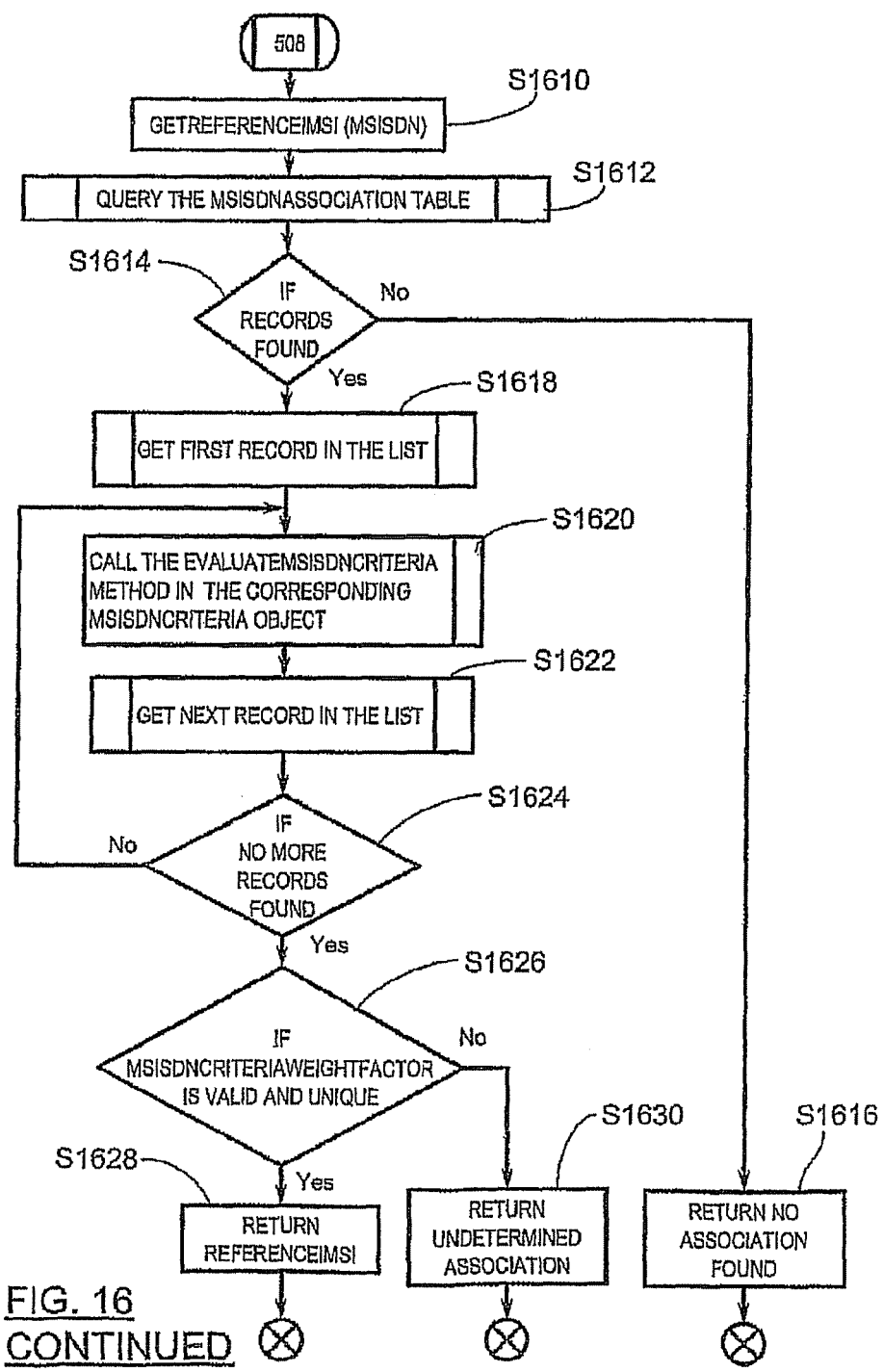

FIG. 16 is a flowchart that depicts the operation of the EvaluateMsIsdnCriteria(MsIsdn) method 308 and the GetReferenceimsi(MsIsdn) method 508. These two methods allow the mobile telecommunications system 100 to dynamically select one IMSI (ReferenceImsi) from a list of IMSIs (ReferenceImsis) that are associated with a MSISDN, based on evaluation criteria (such as current geographical region of the mobile telecommunications device 10, the time instant of a location update request, the next available IMSI in a list of IMSIs, and membership of the subscriber in a group).

The EvaluateMsIsdnCriteria(MsIsdn) method 308 begins at step S1600, and proceeds to invoke the GetReferenceImsi(MsIsdn) method 508 at step S1602.

The GetReferenceImsi(MsIsdn) method 508 begins at step S1610. At step S1612, the GetReferenceImsi(MsIsdn) method 508 queries the MsIsdnAssociation tables 410 for all tables 410 associated with the received MSISDN. At step S1614, the GetReferenceImsi(MsIsdn) method 508 determines whether any associations for the received MSISDN mist. If not, the GetReferenceImsi(MsIsdn) method 508 returns without any ReferenceImsi, at step S1616.

Otherwise, the GetReferenceImsi(MsIsdn) method 508 evaluates all the MSISDN criteria parameter tables (the MsIsdnCriteria-Time tables 412, the MsIsdnCriteria-Location tables 414, and the MsIsdnCriteria-LastRegistration tables 416) associated with the identified MsIsdnAssociation tables 410, at steps S1618 to S1624, To do so, the GetReferenceImsi(MsIsdn) method 508 repeatedly invokes the EvaluateMsIsdnCriteria(Time) method (where the criteria is time), the EvaluateMsIsdnCriteria(Location) method (where the criteria is location), and the EvaluateMsIsdnCriteria(LastRegistration) method (where the criteria is last registration), at step S1620. These three methods (discussed below with reference to FIGS. 17 to 19) calculate values for the MsIsdnCriteria-WeightFactor records 412b, 414b, 416b for each of the MSISDN criteria parameter tables.

After all the MSISDN criteria parameter tables have been evaluated, at step S1626, the GetReferenceImsi(MsIsdn) method 508 attempts to identify the MsIsdn 410a associated with the maximum calculated MsIsdnCriteriaWeightFactor. If the GetReferenceimsi(MsIsdn) method 508 is able to identify a maximum MsIsdnCriteriaWeightFactor, using the ImsiAssociation table 402 and the MsIsdn 410a the GetReferenceImsi(MsIsdn) method 508 returns the ReferenceImsi 402c associated with the maximum MsIsdnCriteriaWeightFactor, at step S1628. Otherwise, the GetReferenceimsi(MsIsdn) method 508 returns no ReferenceImsi, at step S1630.

Then, at step S1604, the GetSubscribedProfile(MsIsdn) method 308 determines whether the GetReferenceImsi(Imsi) method 502 returned a ReferenceImsi. If so, the GetSubscriberProfile(MsIsdn) method 308 returns the ReferenceImsi 402c, at step S1608. Otherwise, using the received MSISDN as a search key to the MobileStation table 204, the EvaluateMsIsdnCriteria(MsIsdn) method 308 returns the ReferenceImsi 202a from the SubscriberProfile table 302, at step S1606.

EvaluateMsIsdnCriteria(Time) Method

Figure 17:
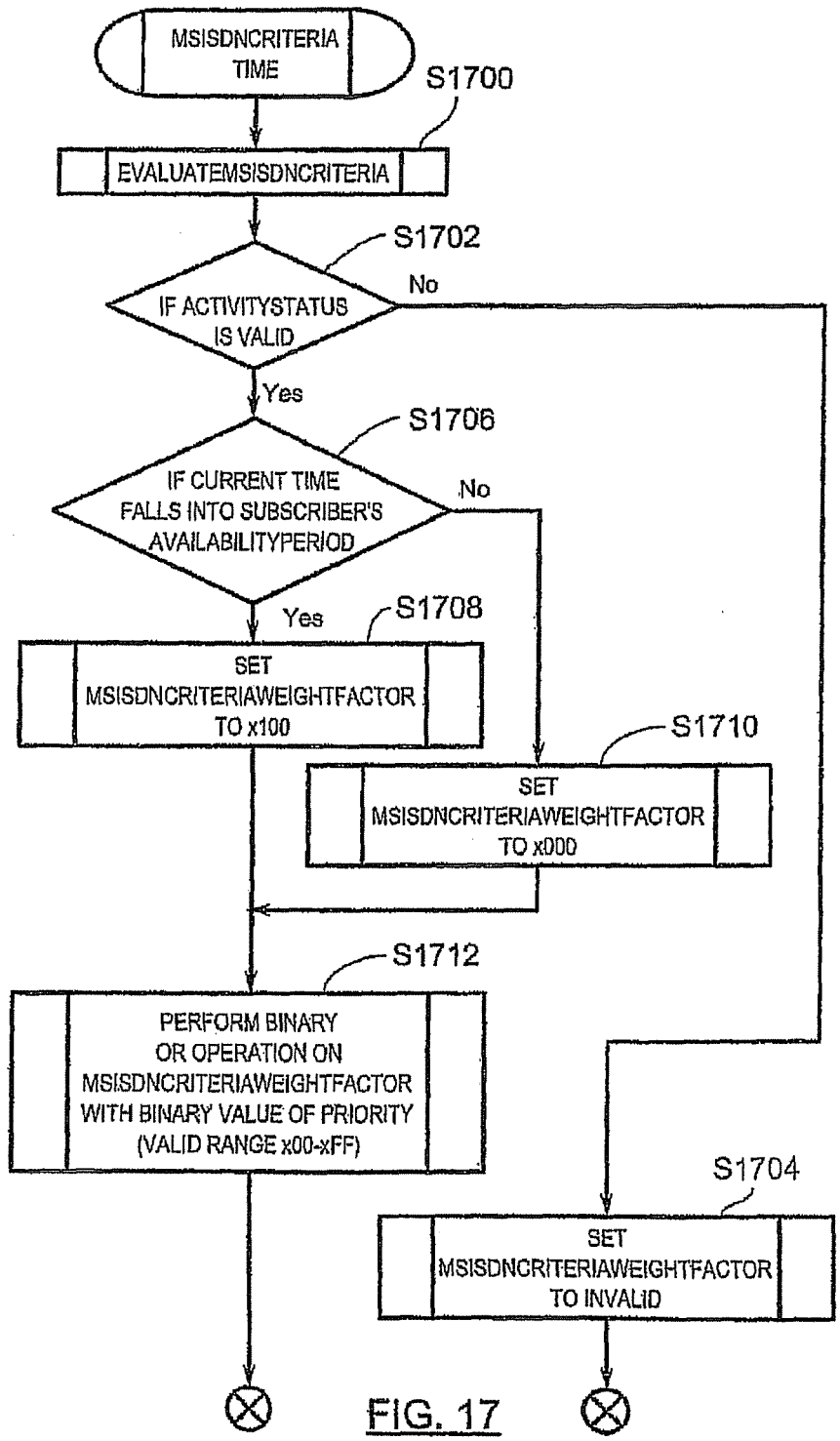
FIG. 17 is a flowchart depicting the operation of the EvaluateMsIsdnCriteria(Time) method of the network management system.

FIG. 17 is a flowchart that depicts the operation of the EvaluateMsIsdnCriteria(Time) method. This method calculates the MsIsdnCriteriaWeightFactor record 412b of the MsIsdnCriteria-Time table 412 that is associated with the received MSISDN.

The EvaluateMsIsdnCriteria(Time) method begins at step S1700. At step S1702, the EvaluateMsIsdnCriteria(Time) method locates the ImsiCriteria-Time table 404 associated with the received MSISDN, and then determines whether the ActivityStatus record 404b of the located ImsiCriteria-Time table 404 has been set (i.e. an IMSI associated with the received MSISDN is located within one of the geographic regions serviced by the mobile telecommunications system 100). If not, at step S1704, the EvaluateMsIsdnCriteria(Time) method returns with an invalid MsIsdnCriteriaWeightFactor.

Otherwise, at step S1706, the EvaluateMsIsdnCriteria(Time) method locates the MsIsdnCriteria-Time table 412 associated with the received MSISDN, and then determines whether the current time is within the time period specified in the AvailabilityPeriod record 412c of the located MsIsdnCriteria-Time table 412. If the current time is within the specified time period, at step S1708, the EvaluateMsIsdnCriteria (Time) method sets MsIsdnCriteriaWeightFactor=x100. Otherwise, at step S1710, the EvaluateMsIsdnCriteria(Time) method sets MsIsdnCriteriaWeightFactor=x000. The EvaluateMsIsdnCriteria(Time) method saves the value of the MsIsdnCriteriaWeightFactor in the MsIsdnCriteriaWeightFactor record 412b.

At step S1712, the EvaluateMsIsdnCriteria(Time) method performs a binary OR operation on the MsIsdnCriteriaWeightFactor record 412b and the Priority record 412c, and saves the result in the MsIsdnCriteriaWeightFactor record 412b. As a result, the GetReferenceImsi(MsIsdn) method 508 will give the IMSI 410b associated with the located MsIsdnCriteria-Time table 412 a higher priority if the criteria specified in the located MsIsdnCriteria-Time table 412 is met, than lithe specified criteria is not met.

EvaluateMsIsdnCriteria(Location) Method

Figure 18:
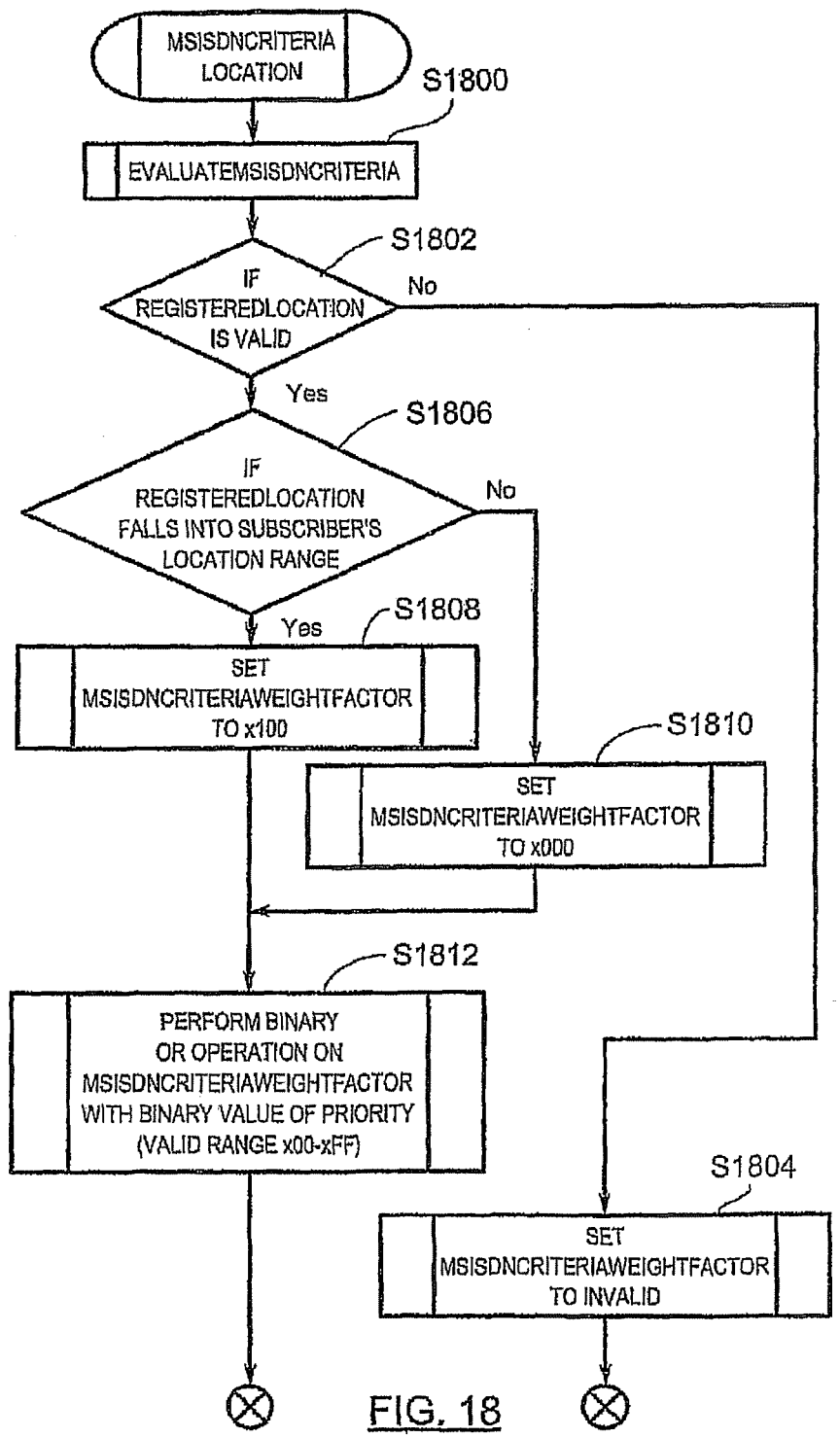
FIG. 18 is a flowchart depicting the operation of the EvaluateMsIsdnCriteria(Location) method of the network management system.

FIG. 18 is a flowchart that depicts the operation of the EvaluateMsIsdnCriteria(Location) method. This method calculates the MsIsdnCriteriaWeightFactor record 414b of the MsIsdnCriteria-Location table 414 that is associated with the received MSISDN.

The EvaluateMsIsdnCriteria(Location) method begins at step S1800. At step S1802, the EvaluateMsIsdnCriteria(Location) method locates the ImsiCriteria-Location table 406 associated with the received MSISDN, and then determines whether the RegisteredLocation record 406b of the located ImsiCriteria-Location table 406 is valid (i.e. the RegisteredLocation record 406b identifies one of the geographic regions serviced by the mobile telecommunications system 100). If not at step S1804, the EvaluateMsIsdnCriteria(Location) method returns with an invalid MsIsdnCriteriaWeightFactor.

Otherwise, at step S1806, the EvaluateMsIsdnCriteria(Location) method locates the MsIsdnCriteria-Location table 414 associated with the received MSISDN, and then determines whether the RegisteredLocation 406b is within the geographical region specified in the LocationRange record 414c of the located MsIsdnCriteria-Location table 414. If the RegisteredLocation 406b is within the specified LocationRange 414c, at step S1808, the EvaluateMsIsdnCriteria(Location) method sets MsIsdnCriteriaWeightFactor=x100. Otherwise, at step S1810, the EvaluateMsIsdnCriteria(Location) method sets MsIsdnCriteriaWeightFactor=x000. The EvaluateMsIsdnCriteria(Location) method saves the value of the MsIsdnCriteriaWeightFactor in the MsIsdnCriteriaWeightFactor record 414b.

At step S1812, the EvaluateMsIsdnCriteria(Location) method performs a binary OR operation on the MsIsdnCriteriaWeightFactor record 414b and the Priority record 414c, and saves the result in the MsIsdnCriteriaWeightFactor record 414b. As a result, the GetReferenceImsi(MsIsdn) method 508 will give the IMSI 410b associated with the located MsIsdnCriteria-Location table 414 a higher priority if the criteria specified in the located MsIsdnCriteria-Location table 414 is met, than if the specified criteria is not met.

EvaluateMsIsdnCriteria(LastRegistration) Method

Figure 19:
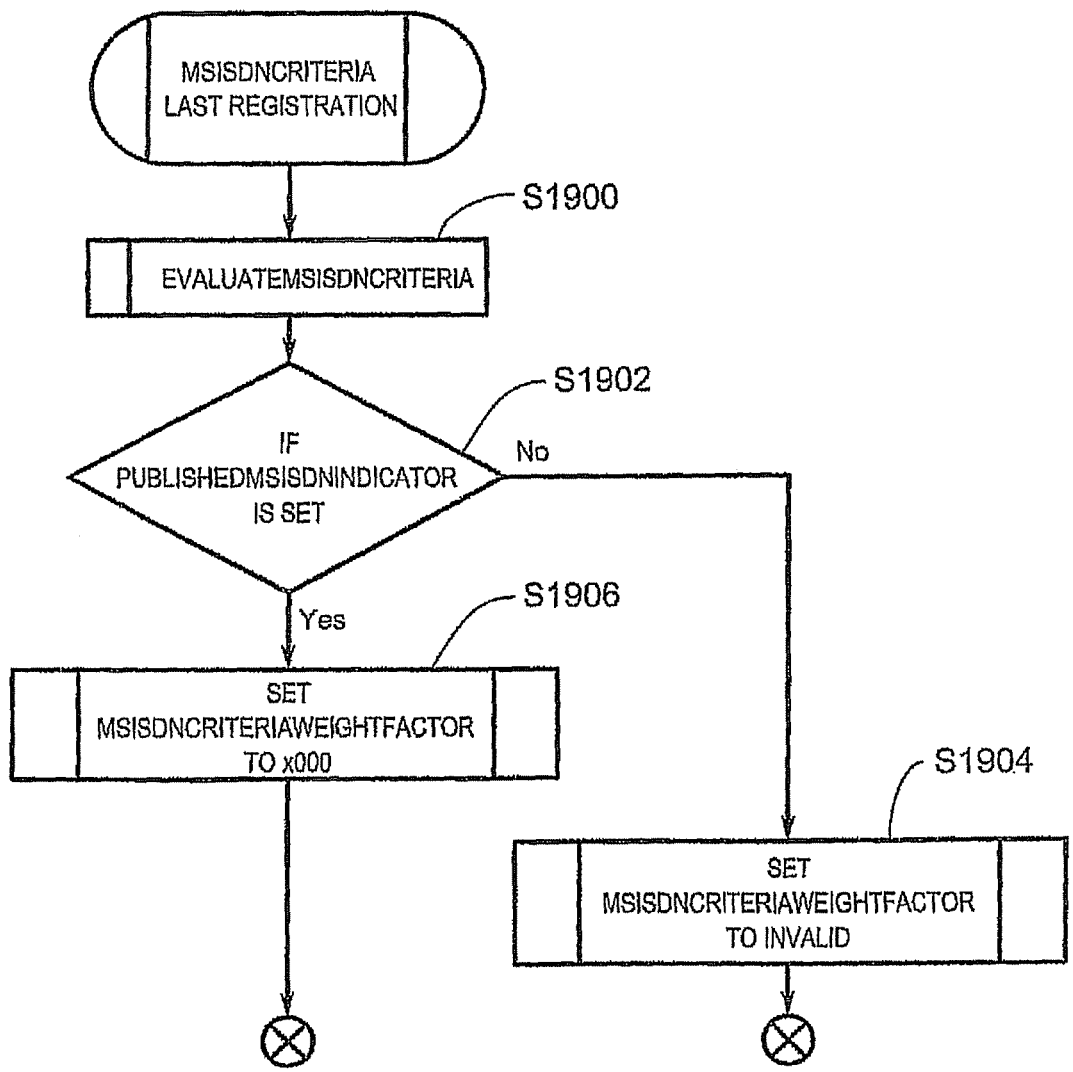
FIG. 19 is a flowchart depicting the operation of the EvaluateMsIsdnCriteria(LastRegistration) method of the network management system.

FIG. 19 is a flowchart that depicts the operation of the EvaluateMsIsdnCriteria(LastRegistration) method. This method calculates the MsIsdnCriteriaWeightFactor record 416b of the MsIsdnCriteria-LastRegistration tables 416 that is associated with the received MSISDN.

The EvaluateMsIsdnCriteria(LastRegistration) method begins at step S1900. At step S1902, the EvaluateMsIsdnCriteria(LastRegistration) method locates the MsIsdnCriteria-LastRegistration table 416 associated with the received MSISDN, and then determines whether the PublishedMsIsdnIndicator 416c flag has been set (i.e. telephone calls to the received MSISDN are authorized for termination at the mobile telecommunications device 10 having the associated LMSI).

If the PublishedMsIsdnIndicator flag has been set, at step S1904, the EvaluateMsIsdnCriteria(LastRegistration) method sets MsIsdnCriteriaWeightFactor=x100. Otherwise, at step S1906, the EvaluateMsIsdnCriteria(LastRegistration) method indicates that the MsIsdnCriteriaWeightFactor is invalid. The EvaluateMsIsdnaiteria(LastRegistration) method saves the value of the MsIsdnCriteriaWeightFactor in the MsIsdnCriteriaWeightFactor record 416b.

As a result, if the IMSI-MSISDN association identified in the located MsIsdnCriteria-Time table 412 and the located MsIsdnCriteria-Location table 414 each have a lower calculated MsIsdnCriteriaWeightFactor than the IMSI-MSISDN association identified in the MsIsdnCriteria-LastRegistration table 416, the EvaluateMsIsdnCriteria(MsIsdn) method 30B will only allow telephone calls to the received MSISDN if the PublishedMsIsdnIndicator 416c flag has been set.

The invention described herein offers several advantages not realized in the current state of the art. First, the MSISDN that is typically assigned to an MK when the mobile terminal 10 roams to a visited geographic region is a local number to the visited geographic region. As a result, calls made from the mobile terminal 10 to other local numbers do not incur long distance or roaming charges.

Second, since each MSISDN is dynamically selected, an entity can maintain a pool of MSISDNs for its personnel, and then select the next available MSISDN when its personnel roam to a new visited geographic region.

Third, since each MST is dynamically selected, an entity can maintain a pool of IMSIs for its personnel (eg. for service representatives), and then select the next available IMSI when its personnel roam to a new visited geographic region. This approach has the benefit of allowing customers to make a local call to the same MSISDN, and have the call routed to those personnel who are presently in the visited geographic region.

Fourth, since each IMSI-MSISDN association and each MSISDN-IMSI association can be defined using various criteria, the invention provides significant flexibility in the assignment of MSISDNs and the termination of calls. For instance, the selection of MSISDNs and IMSIs could be based on membership in a group, so that a block of MSISDNs and IMSIs could be reserved for sales personnel, and another block MSISDNs and IMSIs could be reserved for service personnel Further, sales personnel could be each assigned a specific time block to make sales calls. As a result, none of the sales calls made by the sales personnel during their respective assigned time blocks would be subject to roaming charges. All of the calls would appear to originate from the same number, thereby providing consistency to customers having call display.

Similarly, service personnel could be each assigned a specific time block to answer service calls. As a result, customers could make a local call to the same MSISDN, and have the call routed to the individual assigned to the current time block. If a call originated during a time block for which no service personnel were assigned, the invention could route the call to the service person still residing in the visited geographic region or the service person having a phone number listed with the mobile telecommunications system 100.

Variations on the foregoing embodiments are contemplated herein. For instance, as described herein, each ImsiAssociation table 402 is associated with only one IMSI criteria parameter table (i.e. one ImsiCriteria-Time table 404, one ImsiCriteria-Location table 406, or one ImsiCriteria-LastRegistration table 408). However, one or more of the ImsiAssociation tables 402 may be associated with more than one of the IMSI criteria parameter tables, For instance, in one variation, an ImsiAssociation table 402 is associated with one ImsiCriteria-Time table 404, and one ImsiCriteria-Location table 406, and the GetBasicMsIsdn method 304 is configured to select the BasicMsIsdn associated with the largest combined ImsiCriteriaWeightFactor. This variation allows the mobile telecommunications system 100 to define IMSI-MSISDN associations using multiple or nested criteria.

Similarly, as described herein, each MsIsdnAssociation table 410 is associated with only one MSISDN criteria parameter table (i.e. one MsIsdnCriteria-Time table 412, one MsIsdnCriteria-Location table 414, or one MsIsdnCriteria-LastRegistration table 416). However, one or more of the MsIsdnAssociation tables 410 may be associated with more than one of the MsIsdn criteria parameter tables. For instance, in one variation, a MsIsdnAssociation table 410 is associated with one MsIsdnCriteria-Time table 412, and one MsIsdnCriteria-Location table 414, and the GetSubscriberProfile method 308 is configured to select the ReferenceImsi associated with the largest combined MsIsdnCriteriaWeightFactor. This variation allows the mobile telecommunications system 100 to define MSISDN-IMSI associations using multiple or nested criteria.

This invention is defined by the claims appended hereto, with the foregoing description being merely illustrative of the preferred embodiment of the invention. Persons of ordinary skill may envisage certain modifications to the described embodiments which, although not explicitly suggested herein, do not depart form the scope of the invention, as defined by the appended claims.

The invention claimed is:

1. A method of providing access to telecommunication services, comprising the steps of:
   receiving a routing information request for terminating a communication with a mobile station located within a visited geographic region, the routing information request including a directory number local to the visited geographic region; and
   dynamically selecting a subscriber identity associated with the received directory number from an evaluation of a decision tree, the decision tree associating a reference directory number with a plurality of reference subscriber identities, each reference subscriber identity being associated with a telecommunications service user, each user being registered to receive telecommunication services within a respective home geographic region, the home geographic region being different from the visited geographic region, the mobile station receiving access to the telecommunication services within the visited geographic region via the selected subscriber identity.

2. The method according to claim 1, wherein the decision tree includes at least one logic rule, each said logic rule associating the reference directory number with one of the reference subscriber identities, and the step of selecting the subscriber identity comprises evaluating ones of the logic rules correlating with the received directory number.

3. The method according to claim 2, wherein the logic rule evaluating step comprises evaluating each one logic rule in accordance with at least one of a time instant of the routing information request, the geographic region, a next available one of the subscriber identity in a list of the subscriber identities, and a membership of the user in a group.

4. A non-transitory computer-readable medium carrying computer processing instructions which, when executed by a computer, cause the computer to perform the following steps:
   receive a routing information request for terminating a communication with a mobile station located within a visited geographic region, the routing information request including a directory number local to the visited geographic region; and
   dynamically select a subscriber identity associated with the received directory number from an evaluation of a decision tree, the decision tree associating a reference directory number with a plurality of reference subscriber identities, each reference subscriber identity being associated with a telecommunications service user, each user being registered to receive telecommunication services within a respective home geographic region, the home geographic region being different from the visited geographic region.

5. The computer-readable medium according to claim 4, wherein the decision tree includes at least one logic rule, each said logic rule associating the reference directory number with one of the reference subscriber identities, and the step of selecting the subscriber identity comprises evaluating ones of the logic rules correlating with the received directory number.

6. The computer-readable medium according to claim 5, wherein the logic rule evaluating step comprises evaluating each one logic rule in accordance with at least one of a time instant of the routing information request, the geographic region, a next available one of the subscriber identity in a list of the subscriber identities, and a membership of the user in a group.

* * * * *